United States Patent [19]
Alain

[11] Patent Number: 5,159,559
[45] Date of Patent: Oct. 27, 1992

[54] METHOD OF AUTOMATICALLY DETERMINING THE TOOL PATH IN A PLANE ZONE MACHINING OPERATION

[75] Inventor: Canourgues Alain, Epinay-sur-Seine, France

[73] Assignee: NUM S.A., France

[21] Appl. No.: 517,862

[22] Filed: May 2, 1990

[30] Foreign Application Priority Data

May 3, 1989 [FR] France ............................... 89 06149

[51] Int. Cl.$^5$ .......................................... G05B 19/403
[52] U.S. Cl. .......................... 364/474.28; 364/474.29
[58] Field of Search ...................... 364/474.29, 474.28, 364/474.22–474.27, 474.35, 191–193; 318/568.1

[56] References Cited

U.S. PATENT DOCUMENTS

| | | | |
|---|---|---|---|
| 4,706,200 | 11/1987 | Kishi et al. | 364/474.29 |
| 4,823,273 | 4/1989 | Tanaka et al. | 364/474.29 |
| 4,949,270 | 8/1990 | Shima et al. | 364/474.29 X |
| 4,985,840 | 1/1991 | Shinozaki | 364/474.29 |

*Primary Examiner*—Joseph Ruggiero
*Attorney, Agent, or Firm*—William A. Drucker

[57] ABSTRACT

A method is provided for automatically determining the tool path in plane zone machining, consisting in forming cross lining of the zone to be machined with a pitch depending on the diameter of the tool and using this cross lining successively for producing a grid which is the image of the zone to be machined for shifting the zone to be machined and calculating, after the coding of the machinable points of said zone, the path of the axis of the tool in a succession of linear movements directed either parallel to the axes X and Y of the plane or at 45° with respect thereto.

16 Claims, 33 Drawing Sheets

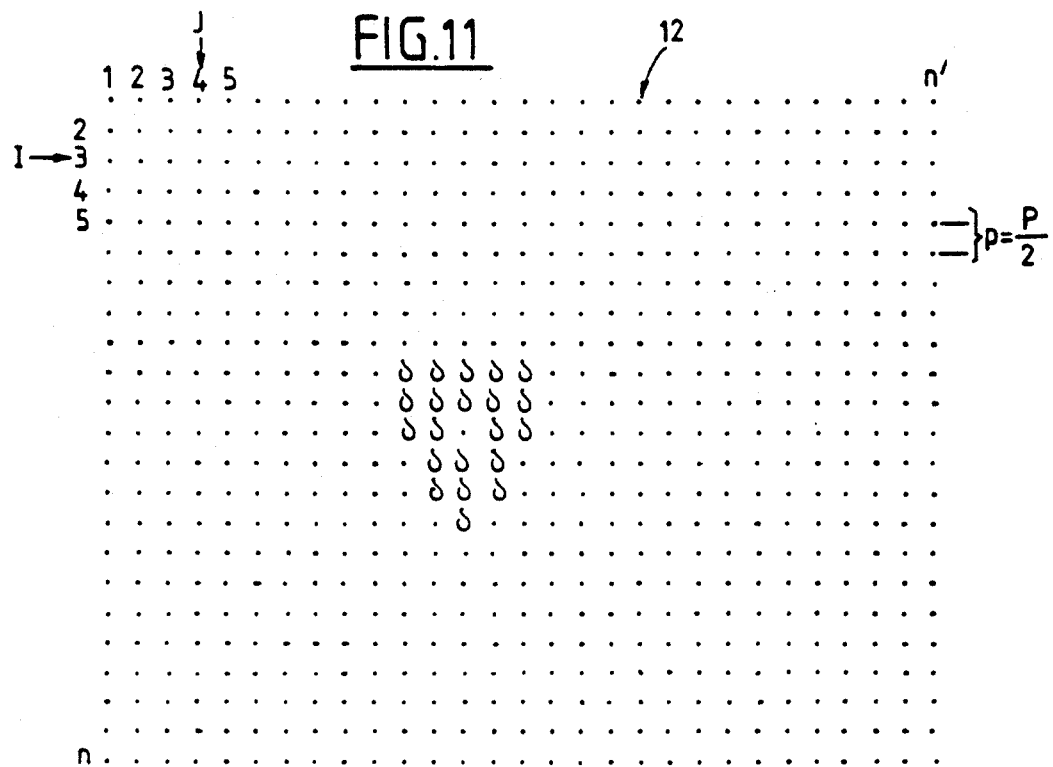
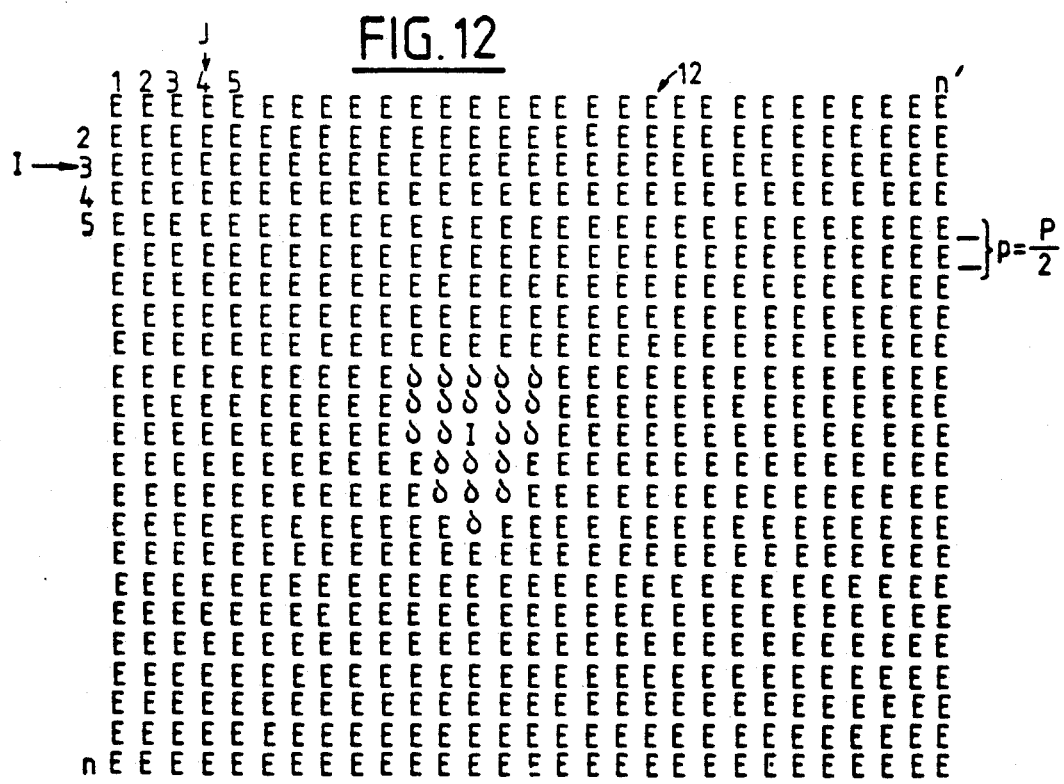

$$
p = P \begin{cases} \phantom{-}1 \\ \phantom{-}2 \\ -3 \\ -4 \\ \phantom{-}5 \end{cases}
\begin{array}{ccccccccccccccc}
 & 1 & 2 & 3 & 4 & 5 &  &  &  & Z_1 & 14 & j &  &  \\
 & 0 & 0 & 0 & 0 & 0 & 0 & 0 & 0 & 0 & 0 & 0 & 0 & 0 & 0 \\
 & 0 & 0 & 0 & 0 & 0 & 0 & 0 & 0 & 0 & 0 & 0 & 0 & 0 & 0 \\
 & 0 & 0 & 0 & A{:}1 & B{:}1 & 1 & 1 & 1 & 1 & 0 & 0 & 0 & 0 & 0 \\
 & 0 & 0 & 0 & 1 & 1 & 1 & 1 & 1 & 1 & 1 & 1 & 0 & 0 & 0 \\
 & 0 & 0 & 0 & 1 & 2 & 2 & 2 & 2 & 1 & 1 & 1 & 0 & 0 & 0 \\
Z_3 & 0 & 0 & 0 & 1 & 2 & 2 & 2 & 2 & 1 & 1 & 1 & 0 & 0 & 0 \\
 & 0 & 0 & 1 & 1 & 1 & 2 & 2 & 1 & 1 & 3 & 1 & 1 & 0 & 0 \\
 & 0 & 0 & 1 & 1 & 1 & 2 & 2 & 1 & 3 & 3 & 1 & 0 & 0 & 0 \\
 & 0 & 0 & 0 & 1 & 1 & 1 & 1 & 1 & 1 & 1 & 1 & 0 & 0 & 0 \\
 & 0 & 0 & 0 & 0 & 0 & 0 & 0 & 0 & 0 & 0 & 0 & 0 & 0 & 0 \\
 & 0 & 0 & 0 & 0 & 0 & 0 & 0 & 0 & 0 & 0 & 0 & 0 & 0 & 0 \\
\end{array}
$$

$Z_2$ spans columns 4–5; $Z_1$ spans the upper-right region; $Z_4$ spans the right portion of rows 6–9.

- coded points
- non coded points

FIG. 34 and FIG. 35 (numerical grids showing pixel value arrays with labeled regions $z'_1$, $z'_2$, $z'_3$, $z'_4$, $z'_5$, axes $I$, $J$, $n$, $n'$, and annotation $p = \frac{P}{2}$).

FIG. 36

$$p = P \begin{cases} 1 \\ 2 \\ -3 \\ -4 \\ 5 \end{cases}$$

with columns labeled $Z'_2$ (2,3,4,5), $Z'_1$, $14'$, $j$, and rows/regions $Z'_3$, $Z'_5$, $Z'_4$:

| | 1 | 2 | 3 | 4 | 5 | | | | | | | | | | |
|---|---|---|---|---|---|---|---|---|---|---|---|---|---|---|---|
| | 0 | 0 | 0 | 1 | 1 | 1 | 1 | 1 | 1 | 1 | 0 | 0 | 0 | 0 | 0 |
| | 0 | 0 | 4 | 4 | 1 | 1 | 1 | 1 | 1 | 1 | 1 | 1 | 1 | 0 | 0 |
| | 0 | 0 | 4 | 4 | 1 | 1 | 1 | 1 | 1 | 1 | 1 | 1 | 1 | 0 | 0 |
| | 0 | 0 | 4 | 4 | 1 | 1 | 1 | 1 | 1 | 1 | 1 | 1 | 1 | 1 | 0 |
| | 0 | 0 | 4 | 1 | 1 | 2 | 2 | 2 | 1 | 1 | 1 | 1 | 1 | 1 | 0 |
| | 0 | 0 | 4 | 1 | 1 | 2 | 2 | 2 | 1 | 1 | 1 | 1 | 1 | 1 | 0 |
| | 0 | 4 | 4 | 1 | 1 | 2 | 2 | 2 | 1 | 1 | 1 | 1 | 1 | 1 | 0 |
| | 0 | 4 | 4 | 1 | 1 | 2 | 2 | 2 | 1 | 3 | 3 | 1 | 1 | 1 | 0 |
| | 0 | 4 | 4 | 1 | 1 | 1 | 1 | 1 | 1 | 1 | 1 | 1 | 1 | 1 | 0 |
| | 0 | 0 | 4 | 1 | 1 | 1 | 1 | 1 | 1 | 1 | 1 | 1 | 1 | 1 | 0 |
| | 0 | 0 | 4 | 4 | 1 | 1 | 1 | 1 | 1 | 1 | 1 | 1 | 1 | 1 | 0 |
| | 0 | 0 | 0 | 1 | 1 | 1 | 1 | 1 | 1 | 1 | 1 | 1 | 1 | 0 | 0 |

FIG. 37

Columns: $A'_1$, $B'_2$, 3, 4, 5, 6, 7, $14'$, ...

| × | × | × | 1 | 2 | 3 | 4 | 5 | 6 | 7 | × | × | × | × | × |
|---|---|---|---|---|---|---|---|---|---|---|---|---|---|---|
| × | × | · | · | 39 | 40 | 41 | 42 | 43 | 44 | 8 | 9 | 10 | × | × |
| × | × | · | · | 38 | 69 | 70 | 71 | 72 | 73 | 45 | 46 | 11 | × | × |
| × | × | · | · | 37 | 68 | 96 | 95 | 96 | 97 | 74 | 75 | 47 | 12 | × |
| × | × | · | 36 | 67 | · | · | · | 94 | 103 | 98 | 76 | 48 | 13 | × |
| × | × | · | 35 | 66 | · | · | · | 93 | 102 | 99 | 77 | 49 | 14 | × |
| × | × | · | 34 | 65 | · | · | · | 92 | 101 | 100 | 78 | 50 | 15 | × |
| × | · | · | 33 | 64 | · | · | · | 91 | × | × | 79 | 51 | 16 | × |
| × | · | · | 32 | 63 | 88 | 89 | 90 | 92 | 93 | 94 | 80 | 52 | 17 | × |
| × | × | · | 31 | 62 | 87 | 86 | 85 | 84 | 83 | 82 | 81 | 53 | 18 | × |
| × | × | · | · | 30 | 61 | 60 | 59 | 58 | 57 | 56 | 55 | 54 | 19 | × |
| × | × | × | 29 | 28 | 27 | 26 | 25 | 24 | 23 | 22 | 21 | 20 | × | × |

|   | 1 | 2 | 3 | 4 | 5 |   |   |   |   | j |   |   |   |   |
|---|---|---|---|---|---|---|---|---|---|---|---|---|---|---|
|   | 0 | 0 | 1 | 1 | 1 | 1 | 1 | 1 | 1 | 1 | 0 | 0 | 0 | 0 | 0 |
| 2 | 0 | 0 | 1 | 1 | 1 | 1 | 1 | 1 | 1 | 1 | 1 | 1 | 1 | 0 | 0 |
| −3 | 0 | 0 | 1 | 1 | 1 | 1 | 1 | 1 | 1 | 1 | 1 | 1 | 1 | 0 | 0 |
| −4 | 0 | 1 | 1 | 1 | 1 | 1 | 1 | 1 | 1 | 1 | 1 | 1 | 1 | 1 | 0 |
| 5 | 0 | 1 | 1 | 1 | 1 | 2 | 2 | 2 | 1 | 1 | 1 | 1 | 1 | 1 | 0 |
|   | 0 | 1 | 1 | 1 | 1 | 2 | 2 | 2 | 1 | 1 | 1 | 1 | 1 | 1 | 0 |
|   | 0 | 1 | 1 | 1 | 1 | 2 | 2 | 2 | 1 | 1 | 1 | 1 | 1 | 1 | 0 |
|   | 0 | 1 | 1 | 1 | 1 | 2 | 2 | 2 | 1 | 3 | 3 | 1 | 1 | 1 | 0 |
|   | 0 | 1 | 1 | 1 | 1 | 1 | 1 | 1 | 1 | 1 | 1 | 1 | 1 | 1 | 0 |
|   | 0 | 1 | 1 | 1 | 1 | 1 | 1 | 1 | 1 | 1 | 1 | 1 | 1 | 1 | 0 |
|   | 0 | 1 | 1 | 1 | 1 | 1 | 1 | 1 | 1 | 1 | 1 | 1 | 1 | 1 | 0 |
|   | 0 | 0 | 1 | 1 | 1 | 1 | 1 | 1 | 1 | 1 | 1 | 1 | 1 | 0 | 0 |

$p = P$ at rows −3, −4. Labels: $Z_2''$, $Z_1''$, $Z_3''$, $Z_4''$, $14''$.

FIG. 51

|   |   | A'' | B'' |   |   |   |   |   |   |   |   |   |   |   |
|---|---|-----|-----|---|---|---|---|---|---|---|---|---|---|---|
|   |   | 1   | 2   | 3 | 4 | 5 | 6 | 7 | 8 |   |   |   |   |   |
| × | × | ×   | ×   | × | × | × | × | × | × | × | × | × | × | × |
| × | × | 41  | 42  | 43 | 44 | 45 | 46 | 47 | 48 | 9 | 10 | 11 | × | × |
| × | × | 40  | 76  | 77 | 78 | 79 | 80 | 81 | 82 | 49 | 50 | 12 | × | × |
| × | 39 | 75 | 104 | 105 | 106 | 107 | 108 | 109 | 110 | 83 | 84 | 51 | 13 | × |
| × | 38 | 74 | 103 | 125 | · | · | · | 118 | 119 | 111 | 85 | 52 | 14 | × |
| × | 37 | 73 | 102 | 124 | · | · | · | 117 | 120 | 112 | 86 | 53 | 15 | × |
| × | 36 | 72 | 101 | 123 | · | · | · | 116 | 114 | 113 | 87 | 54 | 16 | × |
| × | 35 | 71 | 100 | 122 | · | · | · | 115 | × | × | 88 | 55 | 17 | × |
| × | 34 | 70 | 99  | 121 | 120 | 119 | 118 | 117 | 116 | 117 | 89 | 56 | 18 | × |
| × | 33 | 69 | 98  | 97  | 96 | 95 | 94 | 93 | 92 | 91 | 90 | 57 | 19 | × |
| × | 32 | 68 | 67  | 66  | 65 | 64 | 63 | 62 | 61 | 60 | 59 | 58 | 20 | × |
| × | × | 31 | 30  | 29 | 28 | 27 | 26 | 25 | 24 | 23 | 22 | 21 | × | × |

Labels: $14''$.

METHOD OF AUTOMATICALLY DETERMINING THE TOOL PATH IN A PLANE ZONE MACHINING OPERATION

BACKGROUND OF THE INVENTION

The present invention relates to a method of automatically determining the tool path in an operation for plane machining any zone or region of a workpiece, which zone is either a pocket (understood closed), or a so-called open pocket, or else a surfacing. This method applies both to the case where each of these three zones is considered alone, i.e. free of an islet or recess and to the case where each of these three zones contains at least one islet and/or at least one recess.

The following definitions are recalled:
- a pocket is a zone of material to be machined whose outer profile is closed and which is surrounded by material not to be machined;
- an open pocket is a zone of material to be machined defined outwardly by a succession of walls and external contour edges of the workpiece, each wall defining a region of material not to be machined;
- a surfacing is a zone of material to be machined defined outwardly by the contour of the workpiece;
- an islet is a zone of material not to be machined whose outer profile is closed and which is located either inside a pocket or inside an open pocket, or inside a surfacing, thus forming an obstacle to be avoided during machining;
- a recess is an empty zone whose outer profile is closed and which is formed either in a pocket, or in an open pocket, or in a surfacing.

Furthermore, in a way known per se, the different profiles considered, respectively pocket, open pocket, surfacing, islet and recess are programmed separately and each consists, in the machining plane, of a section of straight line and /or arc of a circle segments.

Knowing the contour of the zone to be machined, defined in the machining plane, the problem which arises then is to sweep the zone to be machined completely with a cutter, without encroaching on the material limit defined as being the limit with a zone of material not to be machined (edge of pocket or islet) and respecting the following machining requirements as well as possible:
- minimizing the path of the axis of the tool;
- minimizing the number of downward and upward movements of the tool in the zone to be machined, and so the number of boreholes in said zone;
- to take into account the method of working of the tool (by swallowing, or in opposition);
- avoiding passing too many times over a location already machined;
- avoiding the incoming and outgoing traces of the tool.

At the present time, one of the known plane machining techniques which seems to answer these machining requirements best uses an algorithm for obtaining movement of the tool by successive parallel shifts of the profile considered. However, this technique is very complicated to use, particularly when all the possible profile forms are to be taken into account. Moreover, its use has been limited up to now to the case of a pocket with a single islet or a single recess.

The object of the present invention is to provide a method for automatically determining the tool path during plane machining, which satisfies the above machining requirements, which may be used not only in the case of a pocket alone, an open pocket alone, or a surfacing alone, i.e. without islet or recess, but also in that of a pocket, an open pocket or surfacing with at least one islet and/or at least one recess, and which is rapid and relatively simple to put into practice.

SUMMARY OF THE INVENTION

For this, the guiding idea of the method of the invention is based on cross-ruling of the zone to be machined with a pitch depending on the diameter of the tool, this cross-ruling then being used for drawing up a table or grid which is the image of the zone to be machined, for shifting the zone to be machined and elaborating the path of the axis of the tool by a succession of linear movements directed either parallel to the axes of the plane or at 45° with respect thereto.

Thus, for plane machining for example of a pocket (understood to be closed) considered alone and having a closed outer profile formed of a succession of straight line and /or arc of a circle segments in accordance with the invention, the method for automatically determining the path of the tool is characterized in that it comprises the following steps:

1. formation of cross-ruling in the plane (X-Y) over the whole pocket using the same pitch for the lines and columns which depends on the diameter of the tool, the apices of the cross-ruling being referenced by line and column indices;

2. quantification of the pocket profile consisting:
   - starting from the cross-ruling, in determining by their respective line and column indices, on the one hand, points, called limit points which are the apices of the cross-ruling the closest to the pocket profile, obtained by searching, in each line and each column of the cross-ruling, for the intersections with the profile and, on the other hand, the points situated respectively inside and outside the profile which are the apices of the cross-ruling left unoccupied by the limit points;
   - tranferring to an intermediate table proper to the pocket profile and having the same dimensions and the same line and column pitch as the cross-ruling, in the same indexed line and column positions as those of the cross-ruling, the respectively limit, inner and outer points of the profile, representing them using respective identification symbols;

3. elaborating a table which is the image of the pocket, called result table, having the same dimensions and the same line and column pitch as the intermediate table, formed of a first zone representative of the pocket and formed of machinable points to each of which is assigned a same first given character and which correspond to the inner points of the pocket profile, and a second zone external to the first one and formed of non machinable points to each of which is assigned a same second given character different from the first one and which correspond to the limit and outer points of the pocket profile;

4. shifting the pocket profile which consists, starting from the result table previously elaborated, in determining for each non machinable point of the second zone of the result table the machinable points of the first zone whose distance to said non machinable point is less than the radius of the tool, and in transforming these machinable points into non machinable points to which the same second character is assigned;

5. coding of the machinable points of the first zone of the result table once the shift has been effected, which consists:

in taking into account any first point of said zone, called starting point, and in assigning thereto a level represented by the integer 1;

in taking into account a second point adjacent the starting point and situated on the same line or same column as the latter and assigning thereto a level represented by the integer 2;

in then passing from a coded current point to the next point by searching among its neighbors to see if there exists a non coded point, this search taking place from the point which was coded previously to the current point and turning about the current point in the same predetermined search direction; if the non coded point exists, in assigning thereto a level represented by the integer $n+1$ if the level represented by the positive integer n is assigned to the current point; if the non coded point does not exist, in "back-tracking" until a coded point is found which has at least one non coded neighbor, this point becoming the current point the end of coding taking place when the "back-tracking" is effected as far as the starting point and when the latter has no longer a non coded neighbor;

6. machining the first zone of the result table by determining the passage of the tool through each of the points coded in the preceding step so as to obtain a succession of linear movements of the tool which are oriented either parallel to the axes of the plane (X-Y) or at 45° with respect to these axes, consisting in specifying at the outset that all the coded points are "non machined" points:

in determining first coded point called machining beginning point;

to pass successively from a current point to the next point, said current point being at the outset the start of machining point, in searching among its neighbors for the "non machined" point of highest level and in determining whether this level is less or greater than that of the current point; if it is less, in considering the current point as "machined point" over which the tool does not pass again; if it is greater, in considering the current point as "waiting point" over which the tool may pass again.

Still within the scope of plane machining of the same pocket, but containing at least one islet and/or at least one recess, the pocket as well as the islet and/or the recess each having a closed outer profile formed of a succession of straight line and/or arc of a circle segments the method of the invention repeats the six steps previously numbered 1. to 6. while indicating:

(a) step 2 is a quantification of the profiles considered - pocket, islet and/or recess - consisting:

for each of the profiles considered and starting from the same cross-ruling, in determining by their respective line and column indices, on the one hand, points called limit points which are the apices of the cross-ruling the closest to the profile considered, obtained by searching in each line and each column of the cross-ruling for the intersections with the profile and, on the other hand, the points situated respectively inside and outside the profile which are the apices of the cross-ruling left unoccupied by the limit points;

in transferring to an intermediate table proper to each of the profiles considered and having the same dimensions and the same line and column pitch as the cross-ruling, at the same indexed line and column positions as those of the cross-ruling, the respectively limit, inner and outer points of the profile considered, representing them by respective identification symbols;

(b) that step 3 is an elaboration of a table which is the image of the pocket-islet and/or recess assembly, said result table, having the same dimensions and the same line and column pitch as the intermediate table, comprising a first zone representative of the pocket and formed of machinable points to each of which is assigned the same first given character and which correspond to the inner points of the pocket profile, a second zone external to the first one and formed of non machinable points to each of which is assigned the same second given character different from the first one and which correspond to the limit and outer points of the pocket profile, and inside the first zone, a third zone representative of the islet and formed of non machinable points to each of which is assigned the same third given character different from the second one and which correspond to the limit and inner points of the islet profile and/or a fourth zone representative of the recess and formed of void points to each of which is assigned the same fourth given character different from the third one and which correspond to the limit and inner points of the recess profile;

(c) that step 4 is a shift of each of the profiles consisting, starting from the previously elaborated result table:

in so far as the pocket profile is concerned, in determining for each non machinable point of the second zone of the result table, the machinable points of the first zone whose distance to said non machinable point is less than the radius of the tool, and in transforming these machinable points into non machinable points to which the same second character is assigned;

in so far as the islet profile is concerned, in determining for each non machinable point of the third zone of the result table, the machinable points of the first zone whose distance to said non machinable point is less than the radius of the tool, and in transforming these machinable points into non machinable points to which the same third character is assigned;

in so far as the recess profile is concerned, in determining for each machinable point of the first zone of the result table, the void points of the fourth zone whose distance to said machinable point is less than the radius of the tool, and in transforming these void points into machinable points to which the same first character is assigned.

In another aspect of the invention, starting from the cross-ruling whose pitch is chosen equal to half the machining pass setting which depends on the diameter of the tool, the method comprises processing of the result table after shifting, which consists in only taking into account one line out of two and one column out of two so as to have a result table whose pitch is equal to the machining pass setting. Thus, by dividing the resolution of the result table after shifting by 2, the processing time for the procedure during subsequent coding and machining operations is advantageously reduced significantly.

BRIEF DESCRIPTION OF THE DRAWINGS

Other features and advantages of the invention will be clearer from the detailed description which follows with reference to the accompanying drawings which are given solely by way of example and in which:

FIGS. 11 and 12 show the table proper to the islet profile according to the example of FIG. 5, after determination of the line and column limit points (FIG. 11) and respectively of the inner and outer points (FIG. 12) of the islet profile;

FIG. 16 shows the result table which is the image of the pocket with islet and recess;

FIG. 17 shows the result table of FIG. 16 after the step of shifting the profiles;

FIG. 18 shows the result table of FIG. 17, but with a resolution divided by 2;

FIG. 19 shows the result table of FIG. 18 after the step of coding the machinable points;

FIG. 34 shows the result table which is the image of the open pocket with islet and recess;

FIG. 35 shows the result table of FIG. 34 after the step of shifting the profiles;

FIG. 36 shows the result table of FIG. 35, but with resolution divided by 2;

FIG. 37 shows the result table of FIG. 36 after the step of coding the machinable points;

FIG. 48 shows the result table which is the image of the surfacing with islet and recess;

FIG. 49 shows the result table of FIG. 48 after the step of shifting the profile;

FIG. 50 shows the result table of FIG. 49, but with resolution divided by 2;

FIG. 51 shows the result table of FIG. 50 after the step of coding the machinable points.

DESCRIPTION OF THE PREFERRED EMBODIMENT

Figure 1:
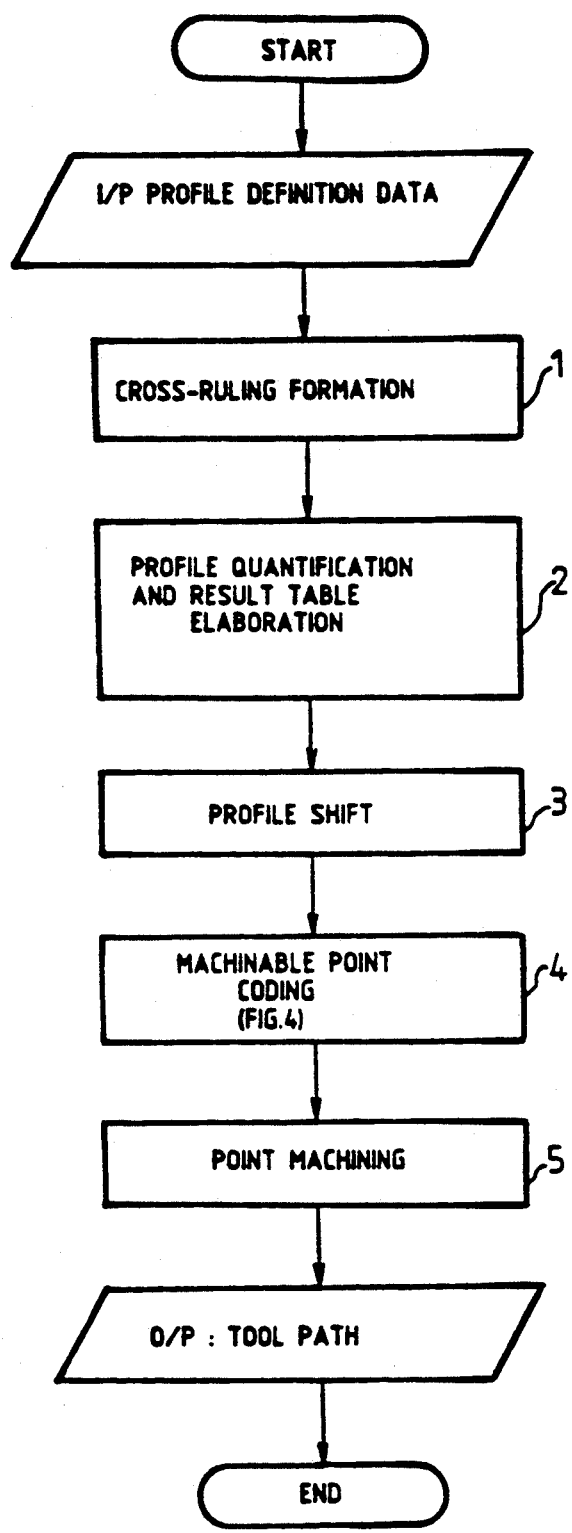
FIG. 1 is a general flowchart of the method of the invention.
Figure 5:
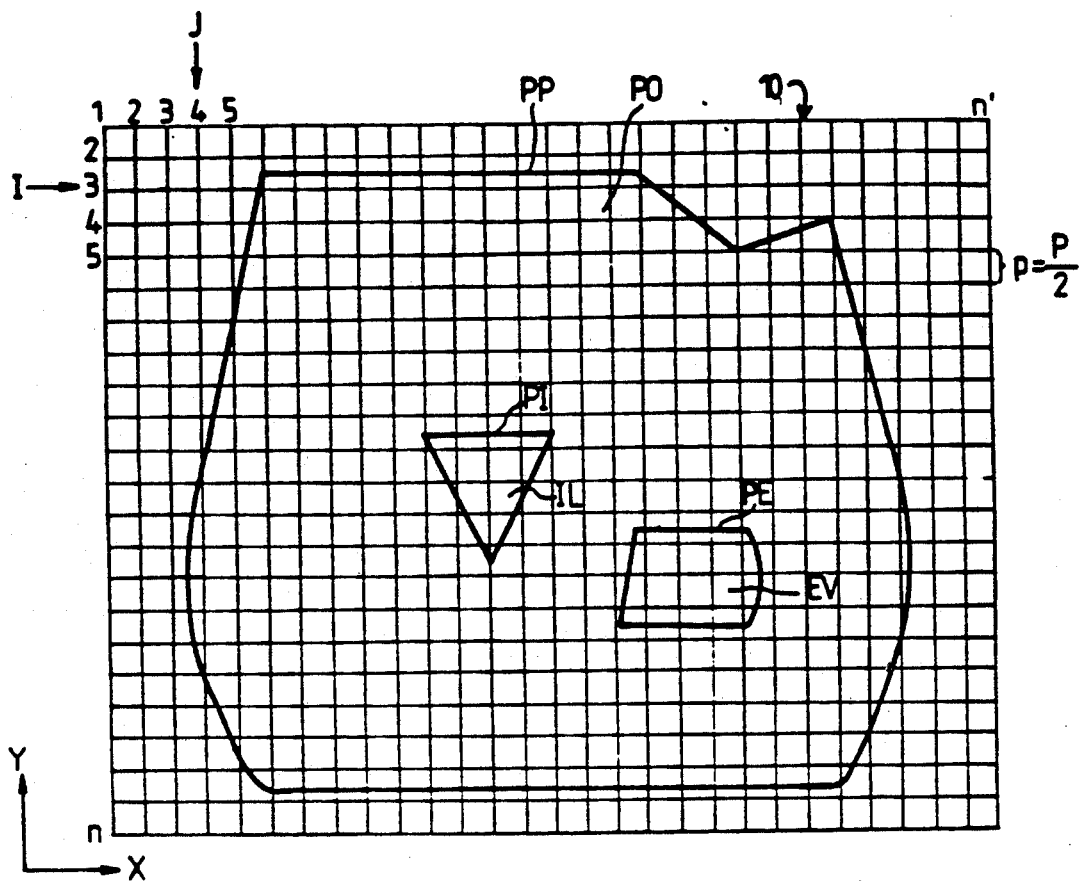
FIG. 5 shows cross-ruling of one pocket example containing an islet and a recess.
Figure 39:
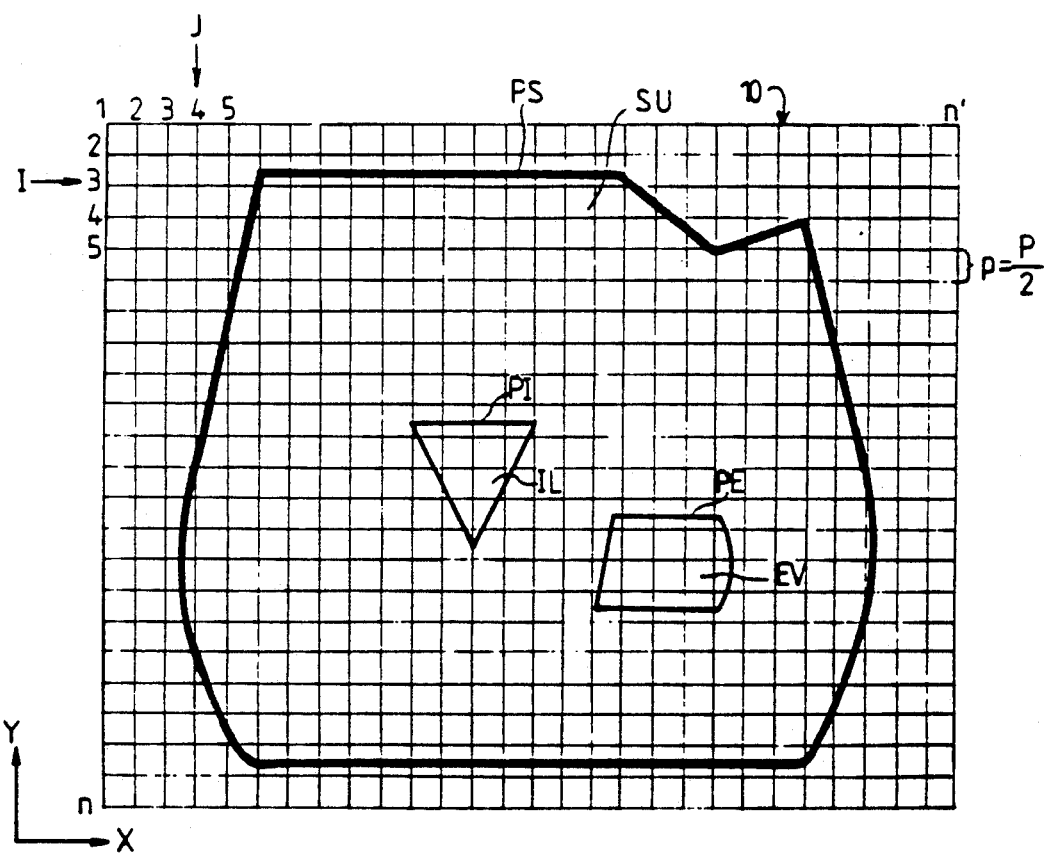
FIG. 39 shows a cross-ruling of the same example of FIG. 5 but applied to surfacing containing the islet and the recess.
Figure 40:
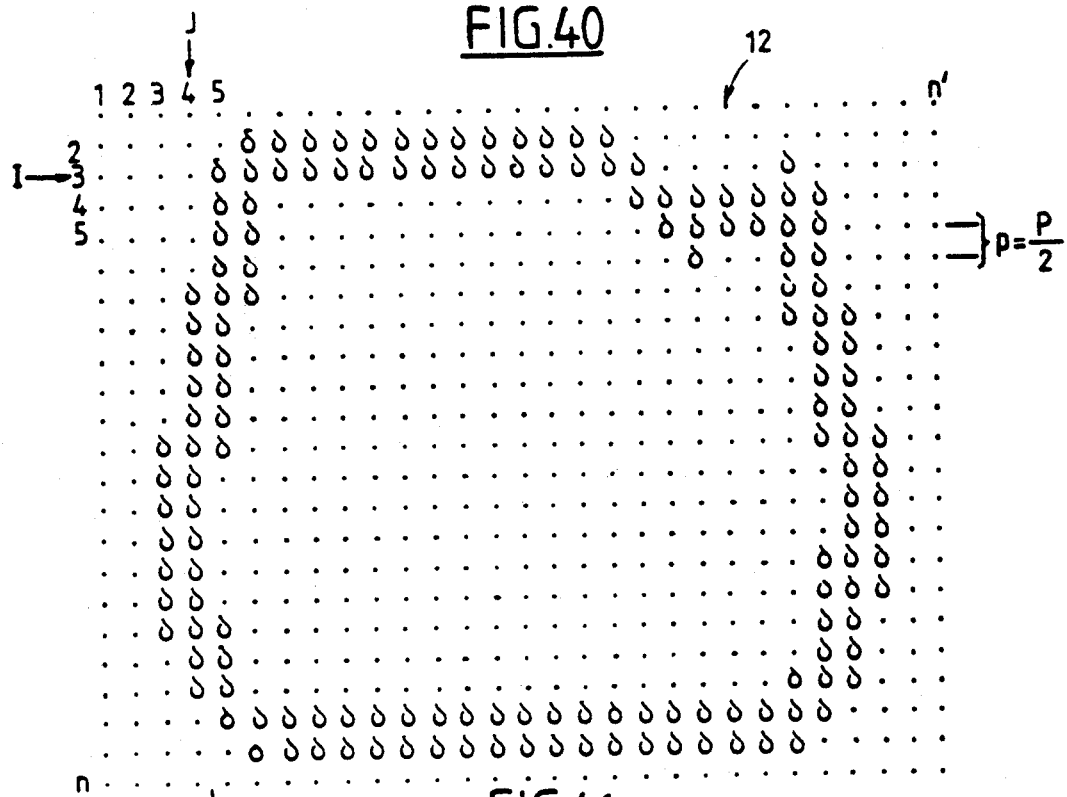
FIGS. 40 and 41 show the table proper to the surfacing profile according to the example of FIG. 39, after determination of the limit points (FIG. 40) and respectively of the inner and outer surfacing profile points (FIG. 41)

FIG. 1 shows in flowchart form the general organization of the main steps of the method for automatically determining the tool path, in accordance with the invention, during plane machining of a pocket (understood to be closed), of an open pocket or a surfacing. To facilitate the description, each of the steps of the procedure will first of all be described in detail successively in relation with a pocket example containing an islet and a recess, such as illustrated in FIG. 5, and then the same procedure will be described more succinctly in relation with the same example of FIG. 5, but applied firstly to an open pocket containing the islet and the recess (FIG. 22) and secondly to surfacing containing the islet and the recess (FIG. 39). Of course, this example (FIGS. 5, 22, 39) is given solely by way of illustration and is in no wise limitative.

In the example of FIG. 5, by PP, PI and PE are designated the three profiles or external contours respectively of the pocket PO, of the islet IL and of the recess EV. Each of these three profiles is defined in the same "PIECE" program and is formed of a succession of straight line and/or arc of a circle segments.

The first step of the method according to the invention referenced at 1 in FIG. 1 consists in forming a cross-ruling 10 (FIG. 5) which extends in a plane (X-Y) over the whole pocket PO with the same line and column pitch, referenced p.

The pitch p of the cross-ruling is preferably chosen equal to half the machining pass setting, which, referenced P, must be less than $D/\sqrt{2}$, D being the diameter of the tool, so as to obtain a path of the tool which is formed of a succession of linear movements oriented, either parallel to the axes X and Y, or at 45° with respect to these axes.

The cross-ruling 10 is therefore constructed with axes parallel to X and Y and a pitch p equal to P/2; the maximum dimensions of the cross-ruling are calculated as a function of the end dimensions of the pocket so that the cross-ruling extends over the whole pocket. Each of the apices of the cross-ruling 10 is referenced by a line index I from 1 to n, n being the number of lines, and by a column index J from 1 to n', n' being the number of columns.

The next step, referenced at 2 in FIG. 1, consists both in quantifying or rendering discrete each of the three profiles considered, PP, PI and PE successively and in elaborating a table, called result table, which is an image of the actual zone to be machined formed by pocket PO, to the exclusion of islet IL and recess EV.

In a preferred embodiment, this step corresponds to the processing flowchart shown in FIG. 2 which will now be described while indicating beforehand that this flowchart, at the level of the result algorithm which it uses, advantageously permits the three profiles considered to be processed successively in any order. By way of example, the pocket profile PP will be processed first of all, secondly the islet profile PI and finally the recess profile PE (FIG. 5).

Figure 2:
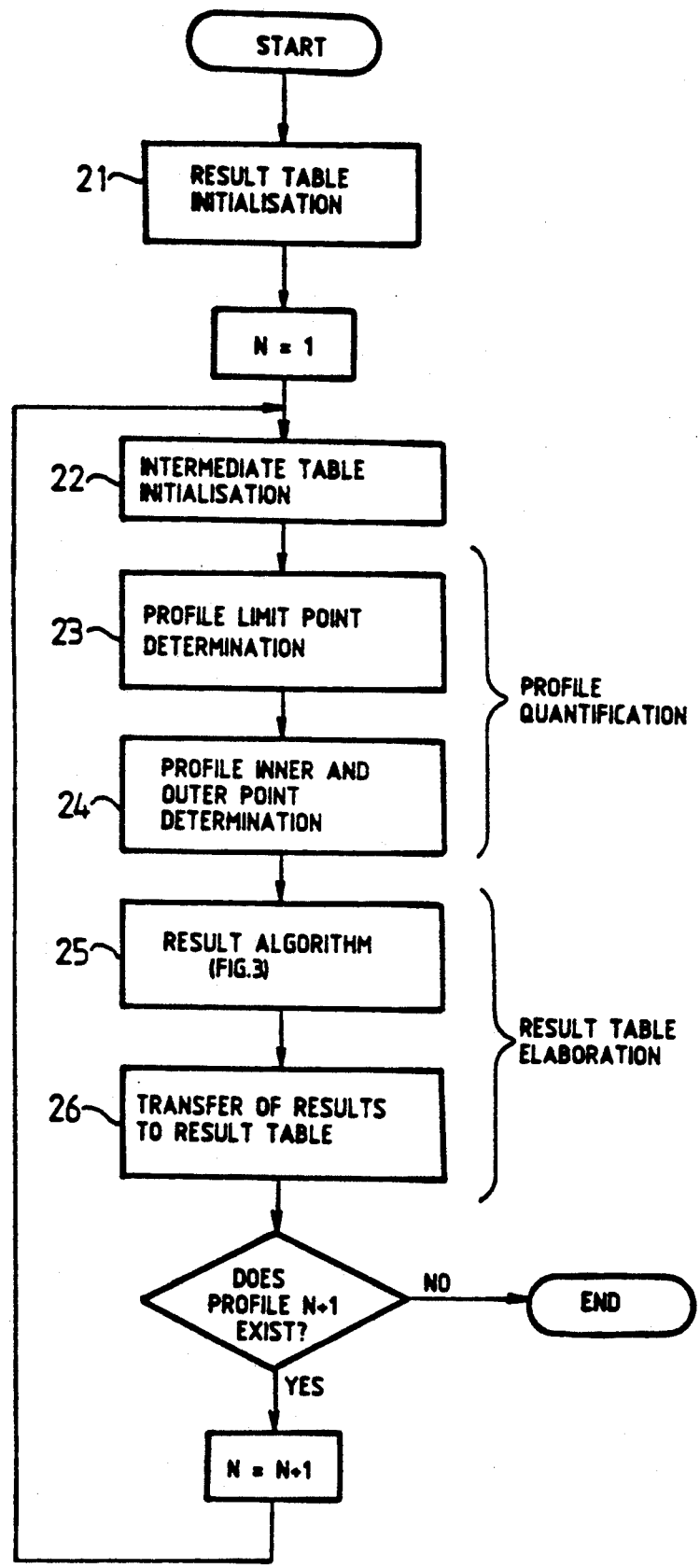
FIG. 2 is a flowchart relative to the joint steps of profile quantification and elaboration of the result table of FIG. 1.
Figures 6, 7:
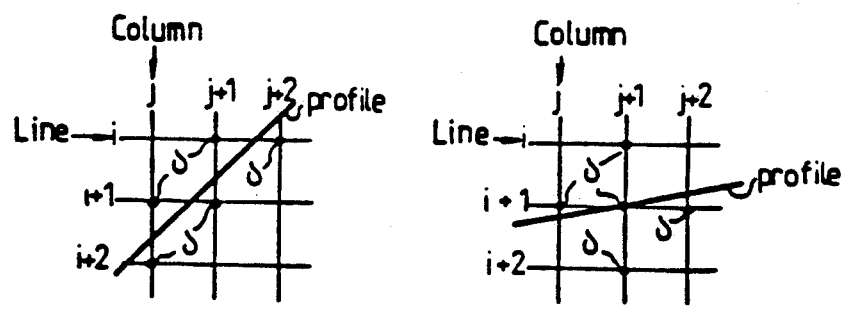
FIGS. 6 and 7 are diagrams explaining the determination of the limit points of a profile portion in which the latter does not pass through an apex of the cross-ruling (FIG. 6) or passes through an apex of the cross-ruling (FIG. 7)

From the flowchart of FIG. 2, for the first profile considered (N=1, N being the number of the profile), here the pocket profile PP, the first operation 23 consists, starting from the cross-ruling 10 previously formed (FIG. 5), in determining by their respective line and column indices, points called limit points of the pocket profile PP. These limit points are the apices of the cross-ruling the closest to the pocket profile PP and they are obtained by searching in each line and each column of cross-ruling 10 for the intersections with profile PP;

Generally, as shown in FIGS. 6 and 7, the limit points, referenced ∂ are the two apices of the cross-ruling the closest to the intersection if the latter is located between two apices (FIG. 6) or the five apices of the cross-ruling the closest to the intersection if the latter merges with an apex (FIG. 7).

Figure 8:
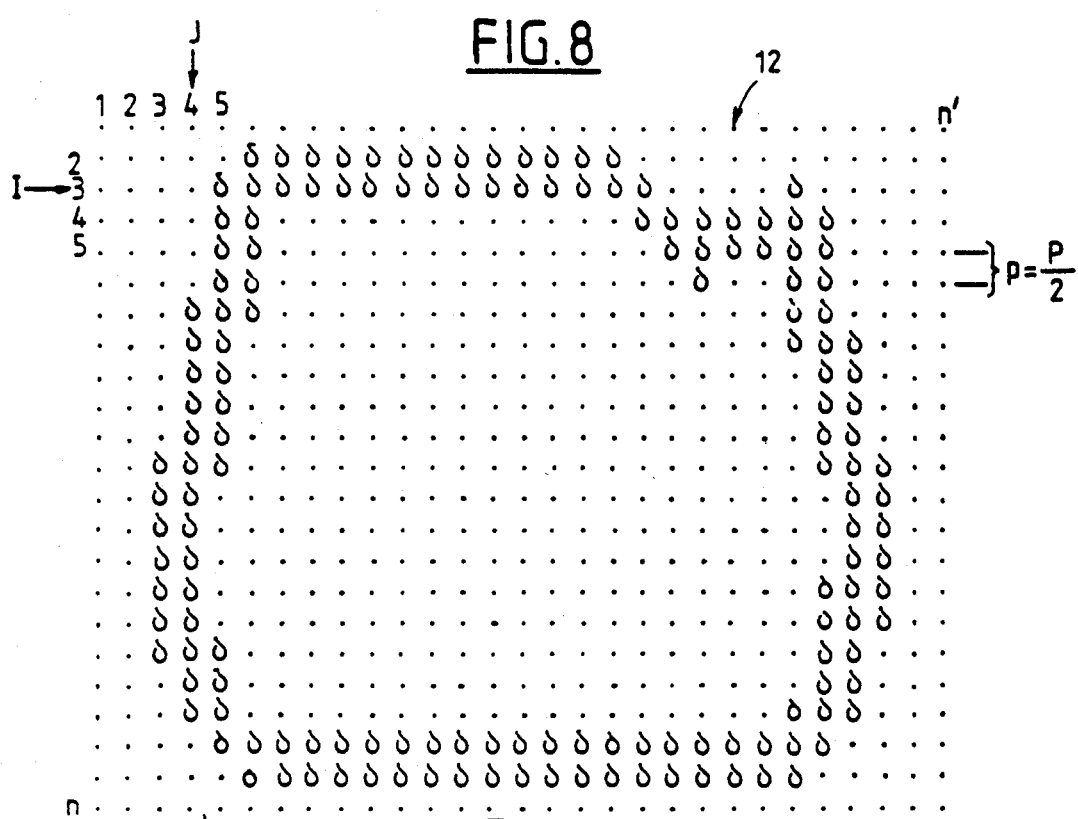
FIGS. 8 and 9 show the table proper to the pocket profile according to the example of FIG. 5, after determining the limit points (FIG. 8) and respectively the inner and outer points (FIG. 9) of the pocket profile.

After determining the limit points ∂ of the pocket profile PP, they are transferred, at the same indexed line and column positions as those of the cross-ruling, in an intermediate table 12, FIG. 8, having the same dimensions and the same pitch p as the cross-ruling 10; the intermediate table 12 is previously initialized when void (operation 22 in FIG. 2).

The next operation 24 (FIG. 2) consists, still from the cross-ruling 10, in determining by their respective line and column indices inner points and outer points of the pocket profile PP which are the apices of the cross-ruling left unoccupied by the previously determined limit points.

All the points of the first and last line, of the first and of the last column of cross-ruling 10 are outer points, by definition of the cross-ruling. All the other outer points of the pocket profile PP are then determined from a given outer point by applying the known labyrinth algorithm, an explanation of which is given in the book "Techniques algorithmiques pour l'intelligence artificielle" by M. GRIFFITHS, pages 40 to 43.

Similarly, knowing an inner point of the pocket profile PP, all the other inner points of the profile are determined by application of said labyrinth algorithm.

Figure 9:
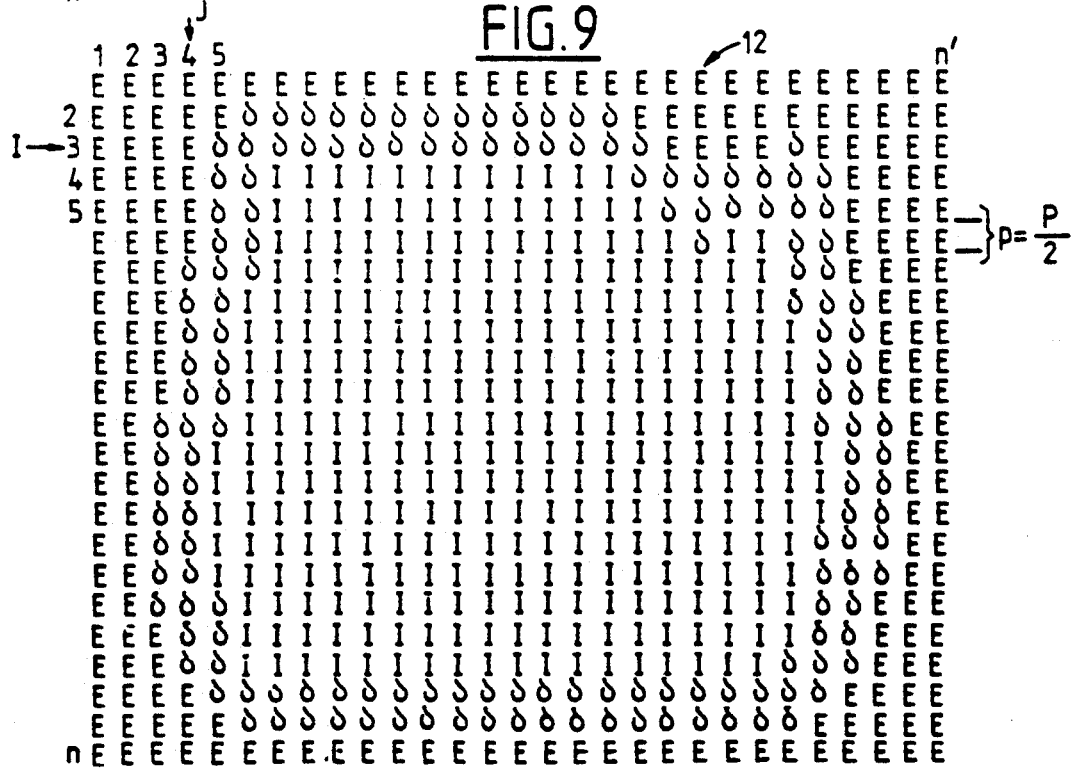

After determining the inner points and the outer points of the pocket profile PP, referenced respectively I and E, they are transferred, in the same indexed line and column positions as those of the cross-ruling, to the intermediate table 12 proper to the pocket profile PP, as can be seen in FIG. 9.

Figure 3:
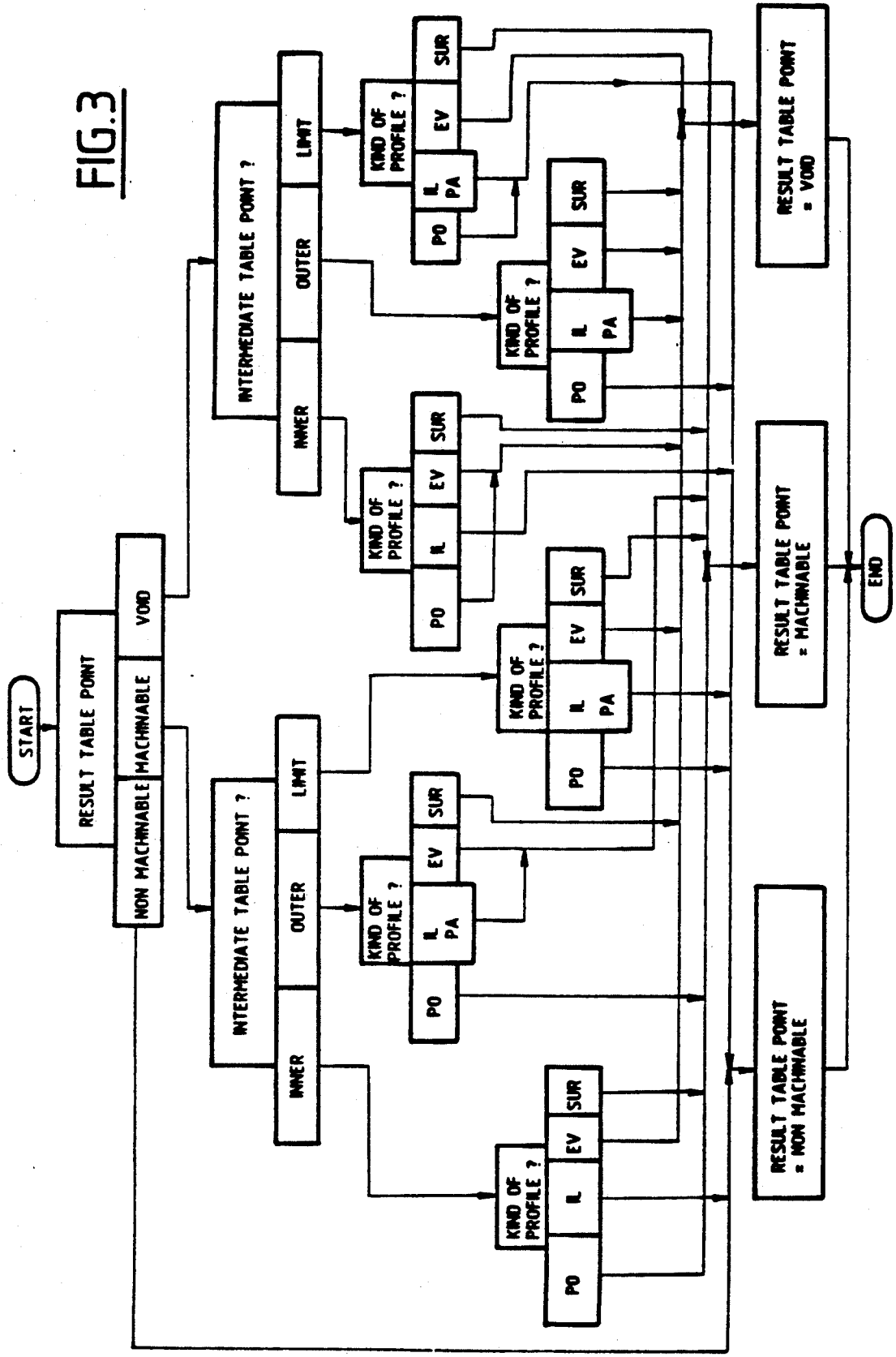
FIG. 3 shows the result algorithm of FIG. 2 in flowchart form.

The next operation 25 (FIG. 2) consists in applying a result algorithm, such as illustrated in FIG. 3, which makes it possible generally, knowing the preceding "machinable", "non machinable" or "void" state taken by each of the points of the table, called result table, having the same dimensions and the same pitch p as the intermediate table 12, to determine the resultant "machinable", "non machinable", or "void" state which each of these points of the result table assumes depending on the nature of the profile being processed, here pocket, islet or recess, and of the limit, inner or outer point type—of the corresponding point having the same indexed position in the intermediate table proper to the profile being processed.

After application of this algorithm, the next operation 26 (FIG. 2) consists in transferring each of the previously determined resultant states to their same respective indexed line and column positions in the result table, in this case in the form:

- of the same first given character, for example the value 1, if the resultant state is a "machinable" state, whatever the profile considered;
- of the same second given character, different from the first one, for example the value 0, if the resultant state is a "non machinable" state, in the case where the profile considered is the pocket profile;
- of the same third given character different from the second one, for example the value 2, if the resultant state is a "non machinable" state in the case where the profile considered is the islet profile;
- of the same fourth given character different from the third one, for example the value 3, if the resultant state is a "void" state in the case where the profile considered is the recess profile.

Figure 10:
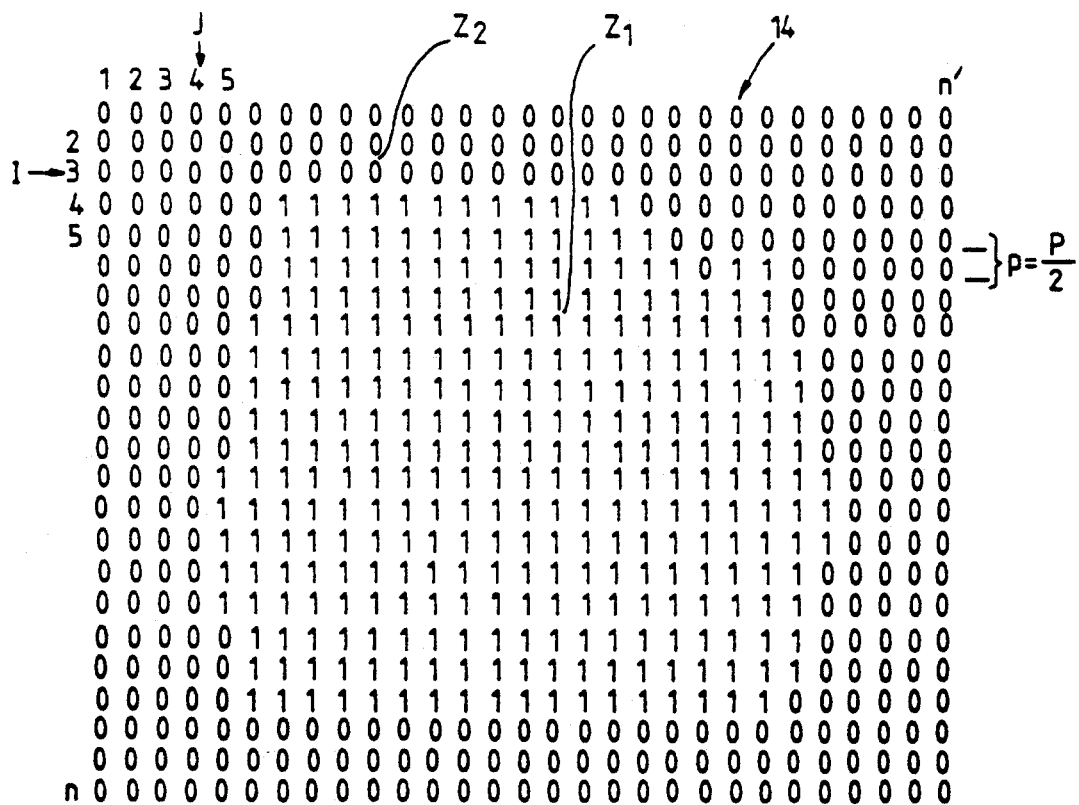
FIG. 10 shows the result table which is the image of the pocket.

In the example of FIG. 5, in which the pocket profile PP is processed first, the result table designated by the general reference 14 in FIG. 10 is first of all initialized (operation 21 in FIG. 2) by putting all its points at the "machinable" state, represented by the value 1. By application of the result algorithm, FIG. 3, each of the machinable points 1 of the initialized result table either remains a machinable point 1 if the corresponding point in the intermediate table 12 (FIG. 9) proper to the pocket profile PP is an inner point I or becomes a non machinable point 0 if the corresponding point in said table 12 is a limit point ∂, or an outer point E. At the end of processing the pocket profile PP, as shown in FIG. 10, the result table 14 obtained is formed of a first zone $Z_1$ representative of the pocket PO and formed of machinable points 1 and a second zone $Z_2$, external to the first one, formed of non machinable points 0.

For the second profile considered, here the islet profile PI (FIG. 5), after having again initialized the intermediate table 12 at void, the limit points ∂, the inner points I and outer points E of the islet profile PI are determined from the cross-ruling 10 in a way identical to that already described in connection with the pocket profile PP. Referring to FIG. 11, the intermediate table 12 has been shown which is proper to the islet profile PI after determination of the limit points ∂ and in FIG. 12, this same table 12 after determination of the inner points I and the outer points E.

Figure 13:
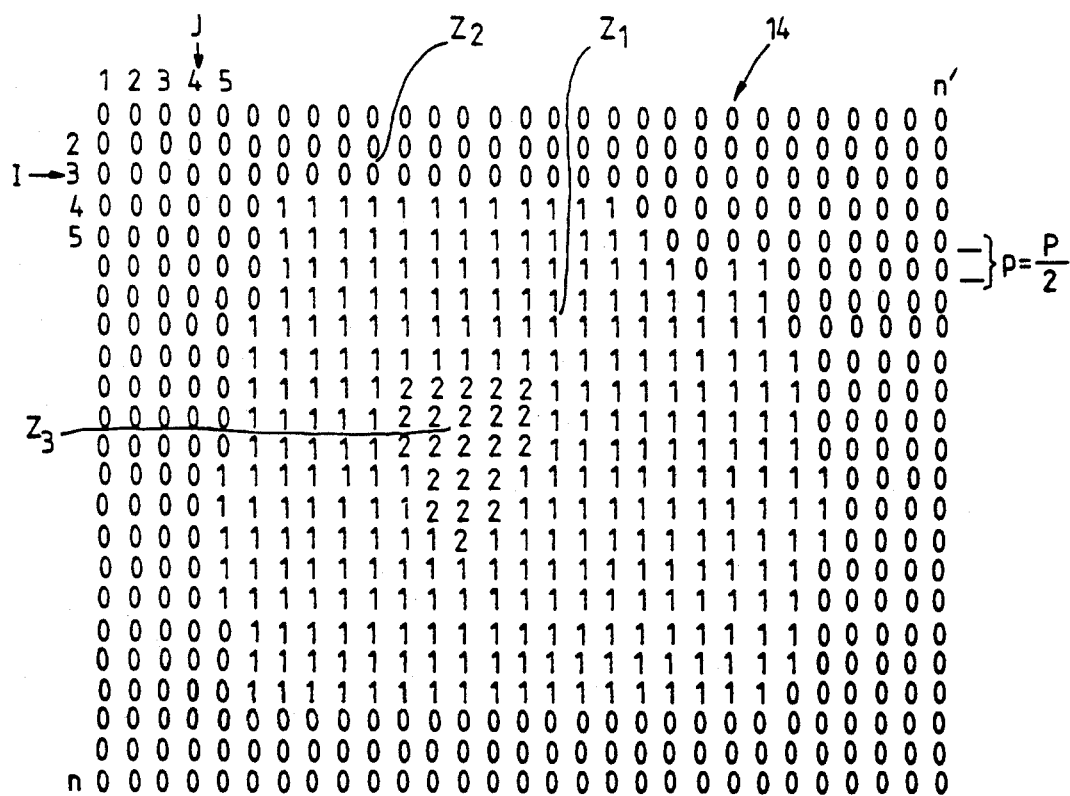
FIG. 13 shows the result table which is the image of the pocket with the islet.

By applying the result algorithm, FIG. 3, from the result table 14 previously obtained (FIG. 10), each of the non machinable points 0 of this result table 14 remains a non machinable point 0, whereas each of the machinable points 1 of said table either remains a machinable point 1 if the corresponding point in the intermediate table 12 (FIG. 12) proper to the islet profile is an outer point E or becomes a non machinable point 2 if the corresponding point in said table 12 is a limit point ∂ or an inner point I. At the end of processing of the islet profile PI, as shown in FIG. 13, the result table 14 obtained reproduces the result table 14 obtained after processing the pocket profile PP (FIG. 10), but in which there appears in the first zone $Z_1$ a third zone $Z_3$ representative of the islet IL and formed of non machinable points 2.

Figure 14:
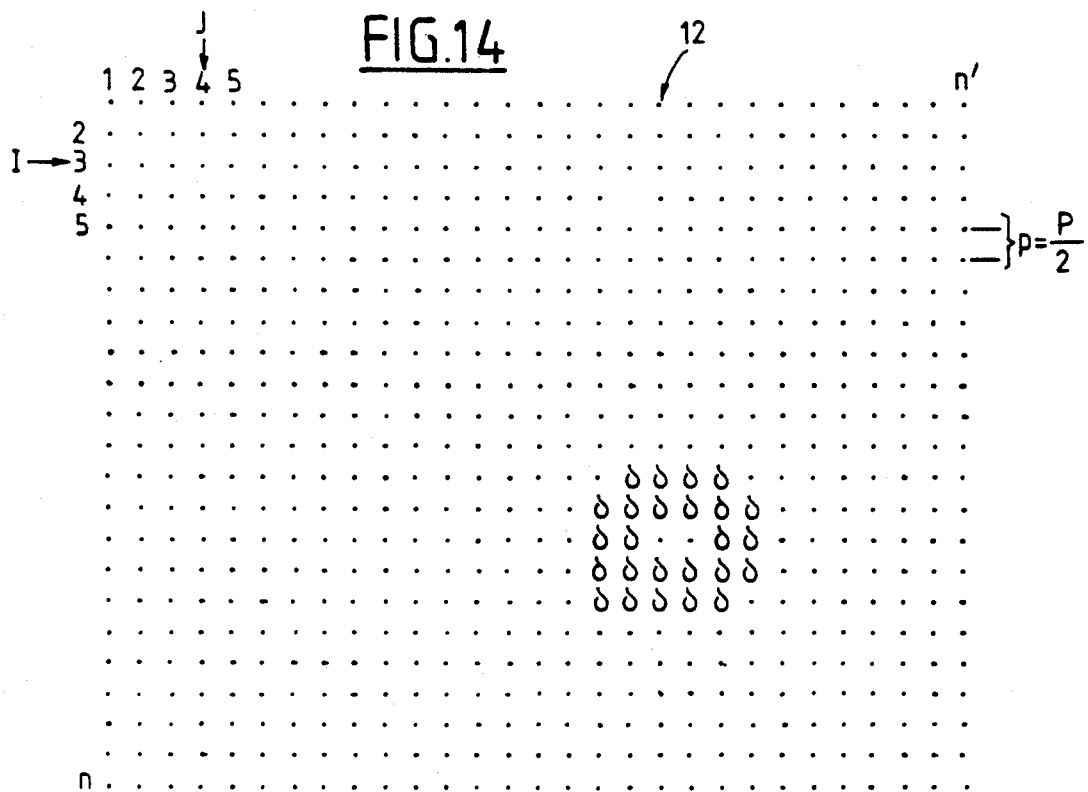
FIGS. 14 and 15 show the table proper to the recess profile according to the example of FIG. 5, after determination of the limit points (FIG. 14) and respectively the inner and outer points (FIG. 15) of the recess profile.
Figure 15:
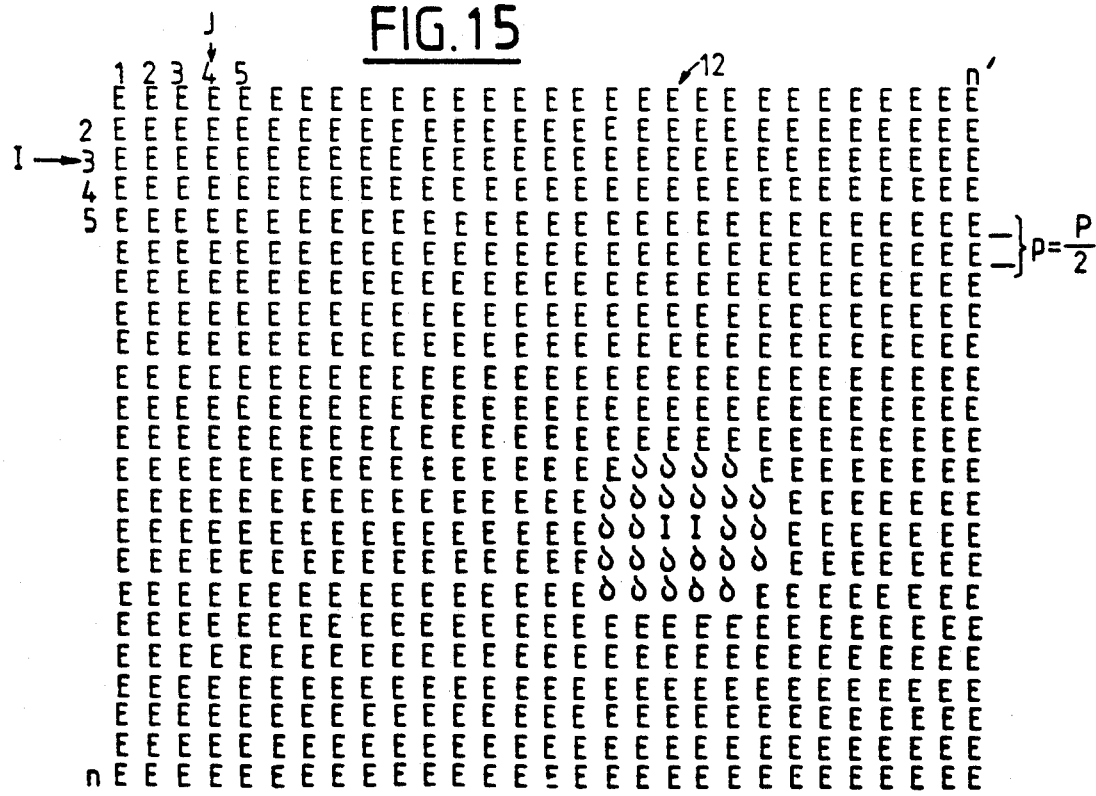

Finally, for the last profile considered, here the recess profile PE (FIG. 5), after again initializing the intermediate table 12 at void, the limit points ∂, the inner points I and the outer points E of the recess profile PE are determined from the cross-ruling 10 in a way similar to that described previously in connection with the pocket profile PP. In FIG. 14 has been shown the intermediate table 12 proper to the recess profile PE after determination of the limit points ∂ and in FIG. 15 this same table 12 after determination of the inner points I and the outer points E.

Again, by application of the result algorithm (FIG. 3) from the result table 14 previously obtained (FIG. 13), each of the non machinable points 0 and 2 of this result table 14 remains a non machinable point 0, respectively 2, whereas each of the machinable points 1 of said table either remains a machinable point 1 if the corresponding point of the intermediate table 12 (FIG. 15) proper to the recess profile is an outer point E, or becomes a void point 3 if the corresponding point in said table 12 is a limit point ∂ or an inner point I. At the end of processing of the recess profile PE, as shown in FIG. 16, the result table 14 obtained reproduces the result table 14 obtained after processing the pocket PP and islet PI profiles (FIG. 13), but in which a fourth zone $Z_4$ appears in the first zone $Z_1$ representative of recess EV and formed of void points 3.

Figures 16, 17:
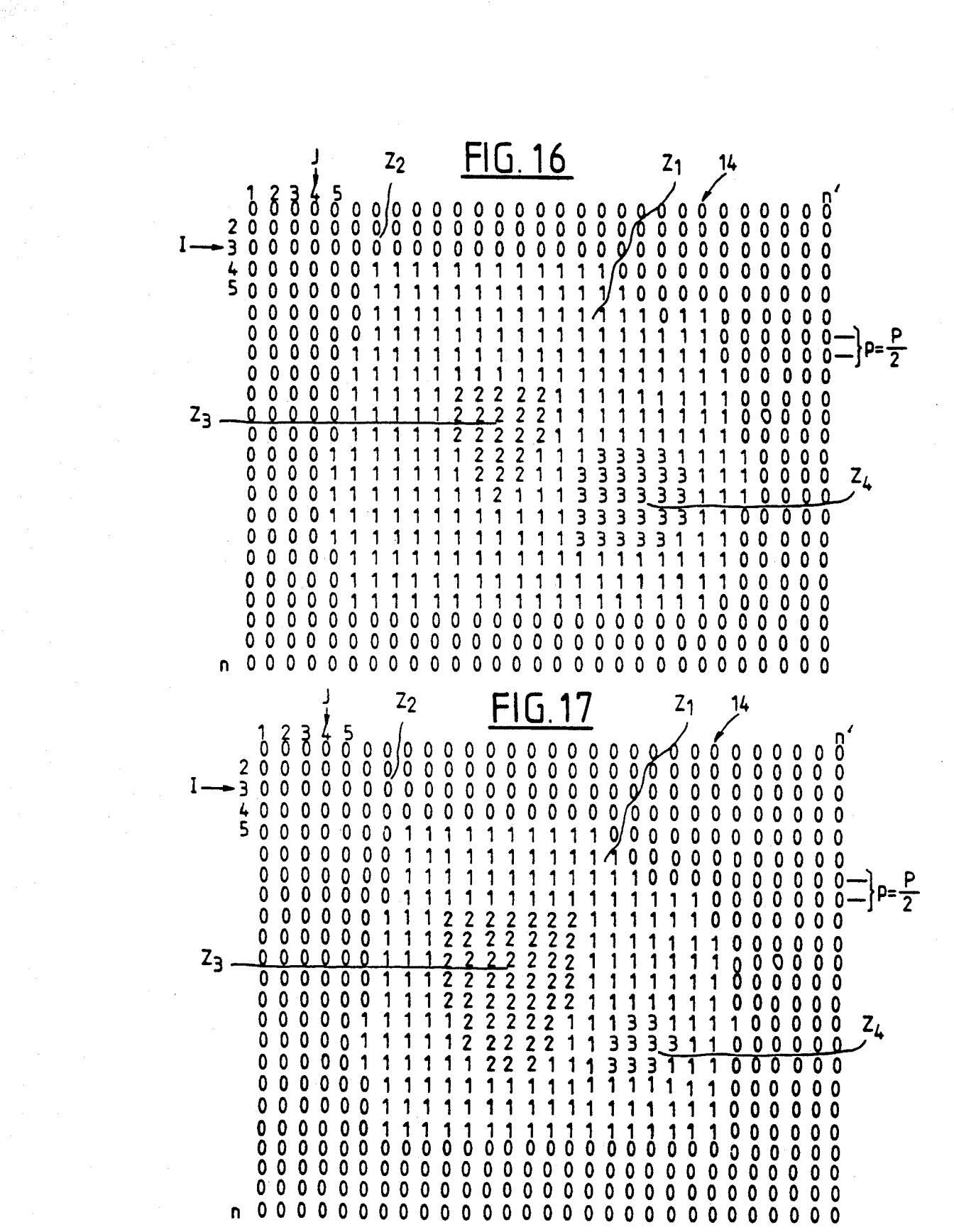

Thus, after processing the pocket PP, islet PI and recess PE profiles, the final result table 14, FIG. 16, is formed of four zones, namely: zone $Z_1$ all the machinable points 1 and including zone $Z_3$ all the non machinable points 2 representative of the islet as well as zone $Z_4$ all the void points 3 representative of the recess, and zone $Z_2$, external to zone $Z_1$, all the non machinable points 0. This result table 14 forms then an image of the actual zone to be machined, in this case zone $Z_1$.

It should be noted that the final result table 14, FIG. 16, may be obtained whatever the order of processing the three profiles considered, because of the result algorithm of FIG. 3, the result table being previously initialized in the "machinable" state. Nevertheless, this result algorithm could be readily modified for, if required, processing the outer profile (pocket) before the two inner profiles (islet and recess); in this case, initialization of the result table would take place by putting all its points in the "void" state.

Furthermore, in the case of plane machining of a pocket alone, i.e. without islet and without recess, or of a pocket solely with islet, processing of the pocket and islet profiles then only involves a particular application of the result algorithm of FIG. 3, the "void" state of the result table being without interest all the more so since the result table is initialized in the "machinable" state, as we saw above.

The next step in the procedure, referenced at 3 in FIG. 1, consists in shifting the zone to be machined, here zone $Z_1$ of the result table 14 previously elaborated (FIG. 16), by eliminating from said zone the machinable points 1 which are prohibited to the axis of the tool, namely the points distant from the material limits (edge of pocket and islet) by at least a tool radius.

Such elimination of the machinable points consists first of all in determining for each non machinable point both in zone $Z_2$ (points 0) and in zone $Z_3$ (points 2), the machinable points 1 of zone $Z_1$ whose distance to said non machinable point is less than the radius of the tool, then in transforming these machinable points 1 into non machinable points 0 if the analyzed non machinable point belongs to zone $Z_2$ or into non machinable points 2 if the analyzed non machinable point belongs to zone $Z_3$.

When the workpiece comprises a recess, as in the example chosen (EV, FIG. 5), it is preferable for mechanical reasons (rigidity of the workpiece, burrs) to effect also an inward shift of the recess by eliminating void points 3 (FIG. 16) which are distant from the zone to be machined by at least a tool radius.

Such elimination of the void points consists first of all in determining for each machinable point 1 of zone $Z_1$ the void points 3 of zone $Z_4$ whose distance to said machinable point is less than the radius of the tool, then in transforming these void points 3 into machinable points 1.

In FIG. 17 has been shown the result table 14 with four modified zones, $Z_1$, $Z_2$, $Z_3$ and $Z_4$ once the shift has been made, zones $Z_1$ and $Z_4$ having become smaller to the advantage of zones $Z_2$ and $Z_3$.

As we saw above, the result table 14 has the same pitch p as the cross-ruling 10 (FIG. 5), which pitch is equal to half the pass setting P of the machining. After shifting the profiles, in order to reduce the time for processing each of the subsequent steps of the procedure, the result table 14 after the shift (FIG. 17) is processed by giving it a pitch equal to the pass setting P. The passage from result table 14 after shifting (FIG. 17)

to the result table 14 of pitch P (FIG. 18) takes place by only taking into account one line out of two and one column out of two, the first line and the first column of the result table being, preferably in this example, subtracted first.

The next step, referenced at 4 in FIG. 1, consists in coding the machinable points 1 of zone $Z_1$ of the result table 14 of FIG. 18 by assigning thereto consecutive levels each represented by a positive integer, using a coding algorithm which will now be described with reference to FIGS. 4 and 18.

Figure 4:
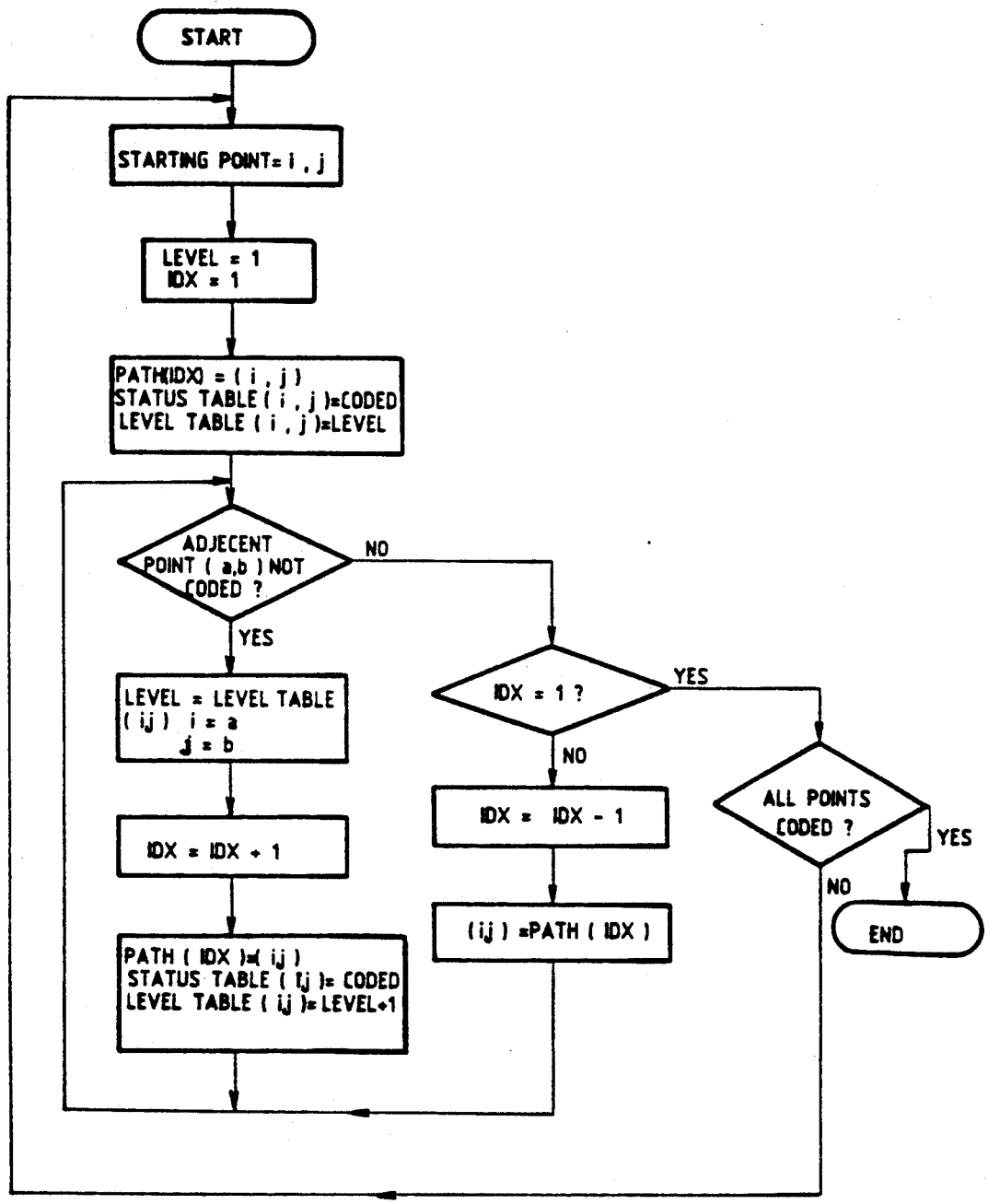
FIG. 4 is a flowchart relative to the step for coding the machinable points of FIG. 1.

According to this algorithm, FIG. 4, the coding consists first of all in taking into account any machinable point of zone $Z_1$ (FIG. 18) called starting point, having coordinates (i, j) and assigning thereto a level represented by the integer 1. The indices i and j of the starting point are stacked in a pile where they are addressed by the same index IDX=1.

Preferably, the starting point for coding is located close to the edge of the pocket or islet. In the present example, the point A (i=3, j=4) of FIG. 18 is chosen as starting point located close to the edge of the pocket and is coded by assigning thereto level 1, as can be seen in FIG. 19.

The next point is a point adjacent the starting point A and is located on the same line and same column as the latter. In the example chosen, this point is point B located on the same line as point A and its indices (i=3, j=5) are stacked in said pile where they are addressed by the next index IDX=2; point B is then coded by assigning thereto the next level 2, as can be seen in FIG. 19.

Figure 20:
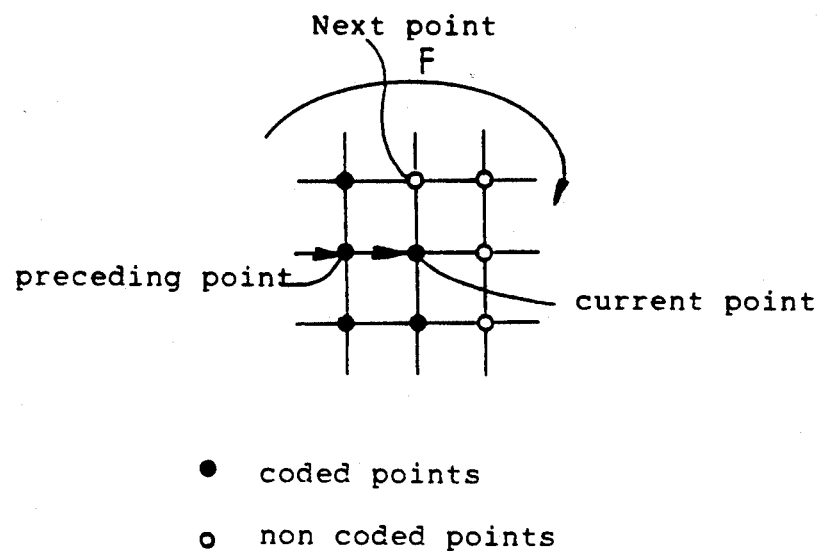
FIG. 20 is a diagram explaining during coding the search for the neighbouring non coded point so as to pass from the current point to the next point.

To pass then from a coded current point of level n (index IDX) to the next point, a search is made among the neighbors of the current point to see if there exists a non coded point. As shown in FIG. 20, this search takes place from the point which was coded previously to the current point and by turning about the current point in the same predetermined search direction, which is constant for all the coding, such for example as the clockwise direction shown by arrow F.

If the non coded point exists, its indices i=a and j=b are stacked in the pile where they are addressed by the next index increased by a unit, namely IDX=IDX+1, this point then forms the next point which is then coded by assigning to it the level n+1 (positive integer). This point becomes then the current point and coding continues.

On the other hand, if the non coded point does not exist, the algorithm incorporates reverse operation which consists in unstacking successively the indices i and j by decrementing by a unit the index IDX, namely IDX=IDX−1, until a coded point is found which has at least one non coded neighbor; this point is then the current point and coding continues in a way identical to that explained above.

The end of coding occurs when reverse operation has been carried out as far as the starting point A of level 1 (index IDX=1) and when the latter has no non coded neighbor.

Figures 18, 19:
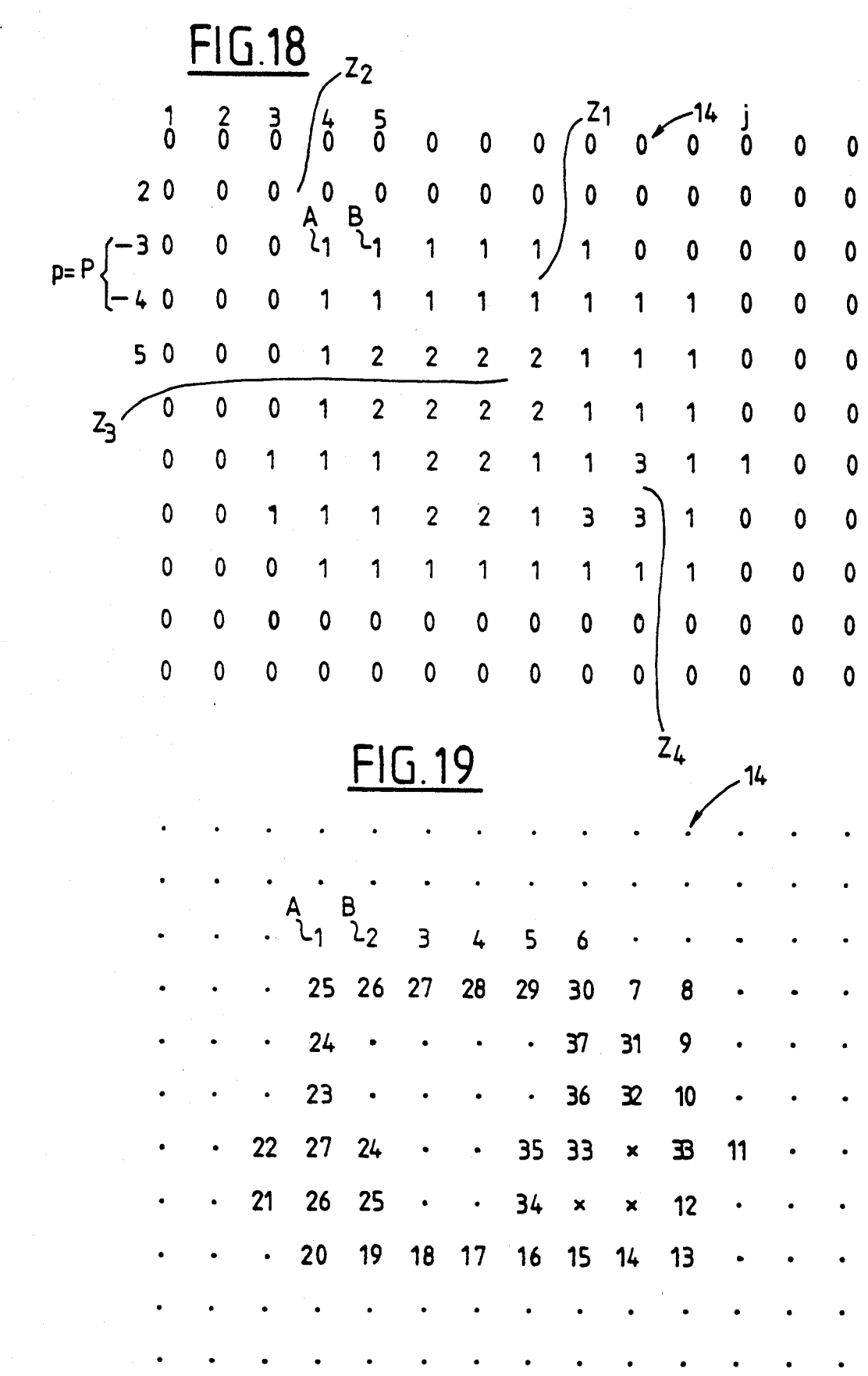

In FIG. 19 has been shown the result table 14 after coding all the machinable points by application of the above described algorithm.

The last step of the procedure, referenced at 5 in FIG. 1, consists in machining the previously coded points by determining the path or trajectory which the tool must follow by passing through each of these points in a succession of linear movements oriented either parallel to the axes X and Y or at 45° with respect thereto.

This machining of the coded points uses the following algorithm:

At the outset, all the coded points are specified "non machined".

First of all as end of machining point is chosen the coding beginning point, here the coded point having level 1 (FIG. 19) itself chosen as point situated close to the edge of the pocket, and as machining beginning point the coded point having the highest level, in this case the point of level 37 (FIG. 19).

Then to pass from a current point to the next point, a search is made among its neighbors to find the "non machined" point of highest level and it is determined whether this level is less or greater than that of the current point.

In the first case, the current point is considered as "machined" point over which the tool does not pass again. In the second case, the current point is considered as a "waiting" point, namely a point physically machined but over which the tool may pass again.

The end of machining occurs when the coded point of level 1 is a "machined" point.

Figure 21:
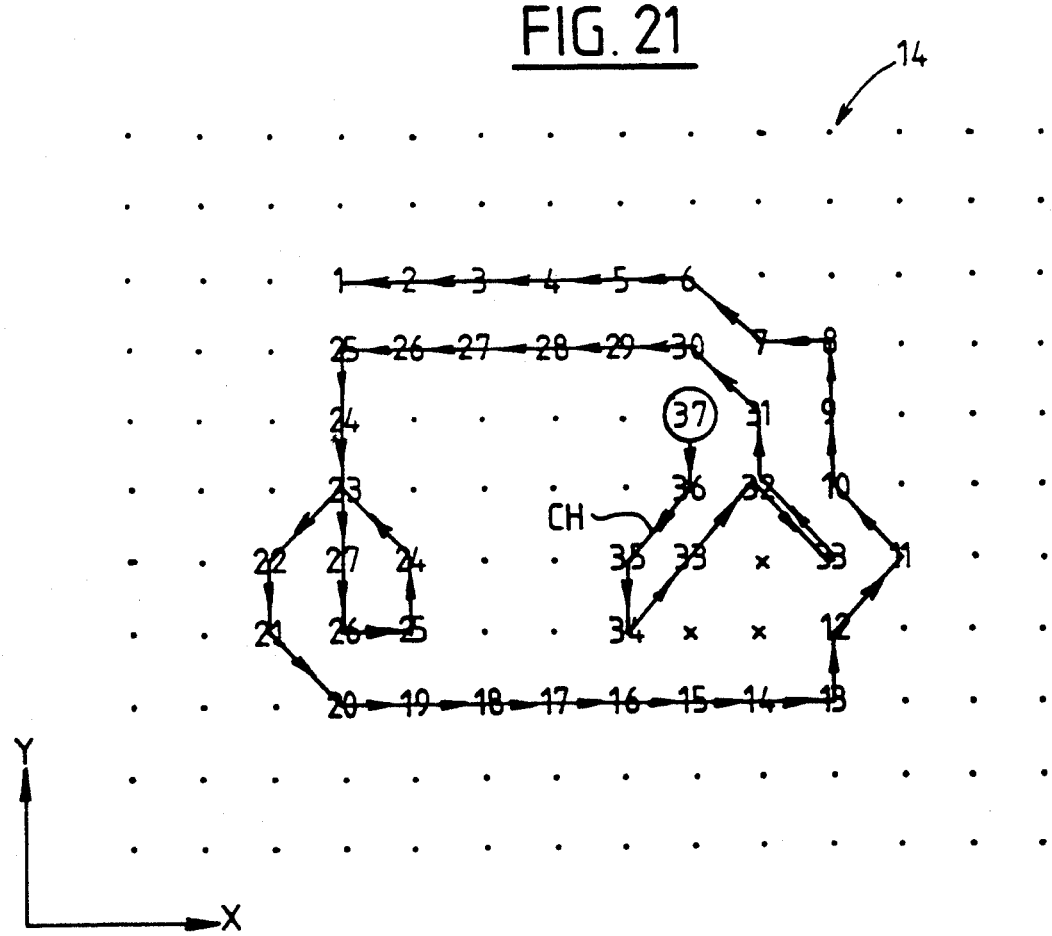
FIG. 21 shows the path of the tool through the coded points of FIG. 19.

In FIG. 21 has been shown the result table 14 in which is plotted the path CH of the tool obtained by applying the above described machining algorithm.

In this example, FIG. 21, it will be noted that the point of level 32 is first of all a "waiting" point, then becomes a machined point after passage through the point of level 33; similarly, the point of level 23 is first of all a "waiting" point then becomes a "machined" point after passage through the points of respective levels 27, 26, 25 and 24, the tool then continuing its path through the point of level 22.

It should be noted that in this example a single bore is made for engaging the tool in the zone to be machined, here at the point of level 37. Generally, advantageously, a single operation is sufficient provided that the zone to be machined does not have a restriction less than the diameter of the tool.

With the machining finished, a finishing shaping operation, preceded if required by a semi-finishing shaping operation, is made about the pocket and the islet.

Figure 22:
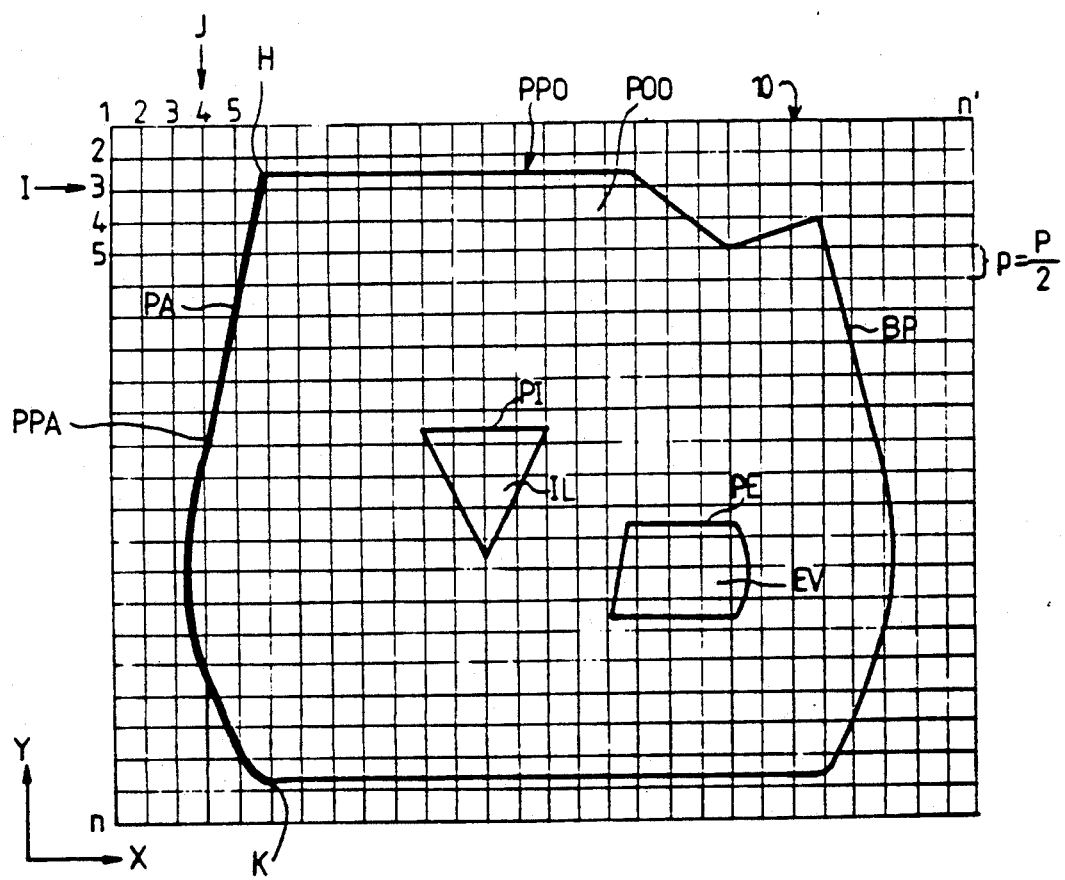
FIG. 22 shows cross-ruling of the same example of FIG. 5 but applied to an open pocket containing the islet and the recess.
Figure 23:
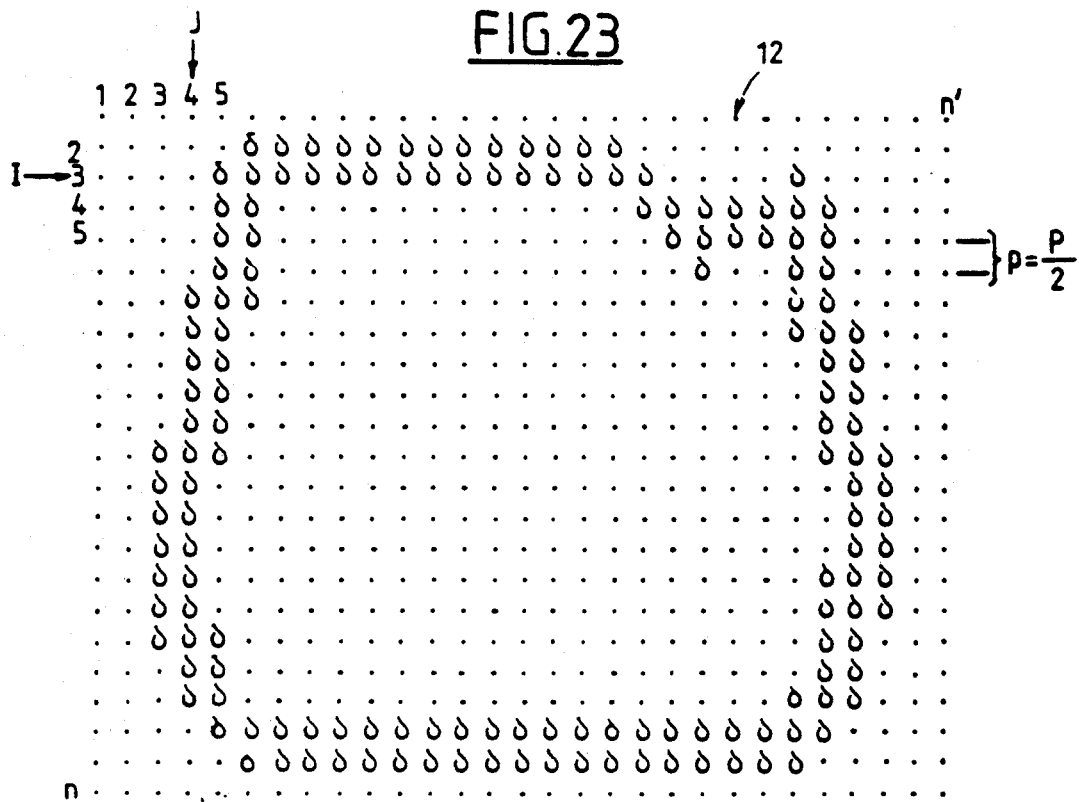
FIGS. 23 and 24 show the table proper to the external overall profile of the open pocket according to the example of FIG. 22, after determination of the limit points (FIG. 23) and respectively of the inner and outer points (FIG. 24) of the overall outer profile of the open pocket.

Referring to FIGS. 22 to 38, the same procedure described previously in relation with the example of FIG. 5 (pocket containing an islet and a recess) will be used while taking the same example applied this time, with reference to FIG. 22, to a so-called open pocket referenced POO containing the islet IL (of profile PI )and the recess EV (with profile PE).

In the example of FIG. 22, the open pocket POO is defined externally by a wall PA defined between the two points H and K, at the left of those in FIG. 22, and defining a region of material not to be machined and by an edge BP of the outer contour of the workpiece. In this FIG. 22, the general reference PPO designates the overall outer profile of the open pocket POO in the plane (X-Y), comprising the profile of the wall of said pocket and the profile of the outer edge of the workpiece.

The overall outer profile PPO of the open pocket POO as well as the profiles PI of islet IL and respectively PE of recess EV, are each defined in the same "PIECE" program and are each formed of a succession of straight line and/or arc of a circle segments.

In the first step of the method according to the invention, the cross-ruling 10, FIG. 22, is formed extending in the plane (X-Y) over the whole open pocket POO in a way identical to that already described in connection with the example of FIG. 5 (pocket with islet and recess).

Then each of the open pocket, islet and recess profiles are quantified successively and the so-called result table is elaborated which is the image of the actual zone to be machined.

In the case of the open pocket POO, FIG. 22, quantification of its profile takes place in two steps: first of all, its overall outer profile PPO is taken into account which is considered as a surfacing profile, namely defined outwardly by the contour of the workpiece, then its wall profile is taken into account, referenced PPA in FIG. 22, which is considered as an islet profile of zero thickness.

Thus, the result table is elaborated after quantification of each of the four profiles considered, namely: the overall outer profile PPO of the open pocket POO, the wall profile PPA of said open pocket, the islet profile PI and the recess profile PE, in any processing order. By way of example, the overall outer profile PPO of the open pocket will be dealt with first of all, secondly the islet profile PI, thirdly the recess profile PE and finally the wall profile PPA of the open pocket.

Figure 24:
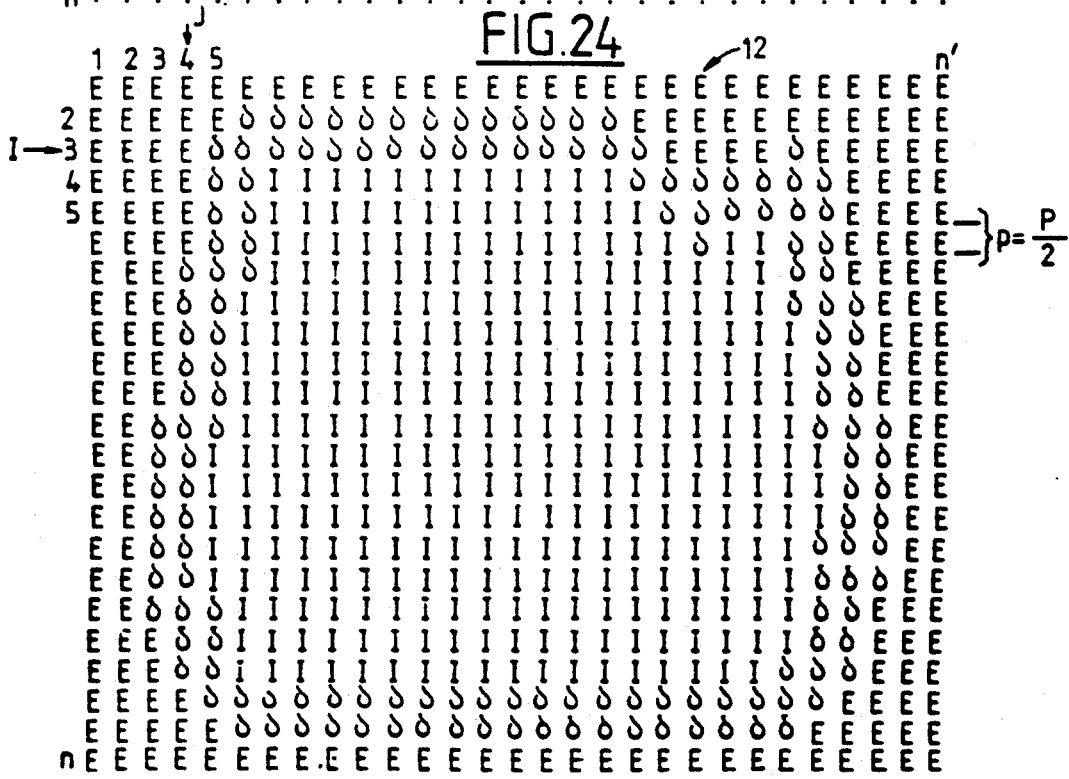

According to the flowchart of FIG. 2, for the first profile considered, here the overall outer profile PPO of the open pocket POO (FIG. 22), and from the cross-ruling 10, in a manner identical to that described above in connection with the example of FIG. 5 (pocket with islet and recess), the limit points ∂ are determined of the overall outer profile PPO of the open pocket POO, which limit points ∂ are then transferred, as before, to the intermediate table 12 (FIG. 23) previously initialized when void, and the inner I and outer E points of the overall outer profile PPO of the open pocket and then transferring them to the intermediate table 12 proper to the overall outer profile PPO of the open pocket, as can be seen in FIG. 24.

Still according to the flowchart of FIG. 2, the result algorithm previously explained (FIG. 3) is then applied, the nature of the profile being processed in the example of FIG. 22 being surfacing for the overall outer profile of the open pocket, a wall of the open pocket, an islet or recess, then each of the resultant states is transferred to the result table in the form:

- of the same first given character, for example of value 1, if the resultant state is a "machinable" state, whatever the profile considered;
- of the second given character different from the first one, for example of value 0, if the resultant state is a "void" state in the case where the profile considered is the outer overall profile - surfacing - of the open pocket;
- of the same third given character different from the second one, for example the value 2, if the resultant state is a "non machinable" state in the case where the profile considered is the islet profile;
- of the same fourth given character different from the third one, for example the value 3, if the resultant state is a "void" state in the case where the profile considered is the recess profile;
- of the same fifth given character different from the fourth one, for example the value 4, if the resultant state is a "non machinable" state in the case where the profile considered is the wall profile of the open pocket.

Figure 25:
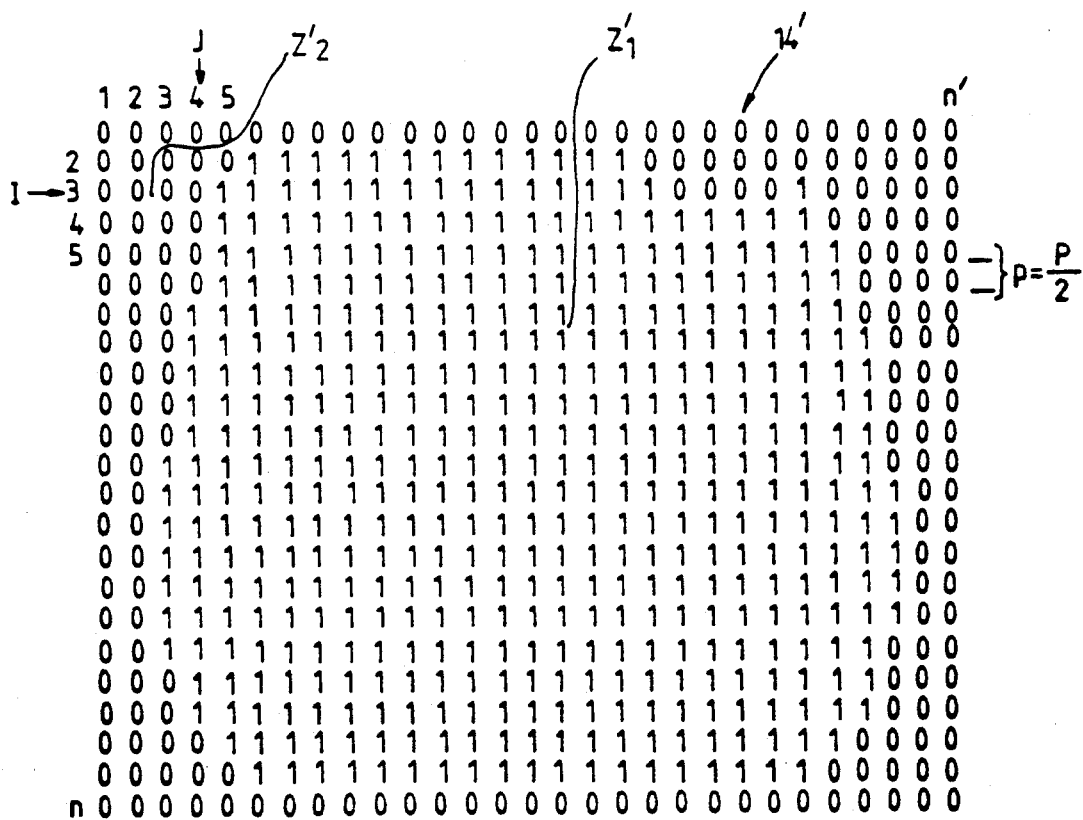
FIG. 25 shows the result table which is the image of the open pocket except for its wall.

In the example of FIG. 22 in which the outer overall profile PPO of the open pocket is processed first, by application of the result algorithm (FIG. 3), and from a result table previously initialized by putting all its points in the "machinable" state represented by the value 1, each of these machinable points 1 of the result table either remains a machinable point 1 if the corresponding point in the intermediate table 12 (FIG. 24) proper to the outer overall profile of the open pocket is a limit point ∂ or an inner point I or becomes a void point 0 if the corresponding point in table 12 is an outer point E. At the end of processing of the outer overall profile PPO of the open pocket, as shown in FIG. 25, the result table obtained, designated at 14', is formed of a first zone $Z'_1$ representative of the open pocket POO and formed of machinable points 1 and a second zone $Z'_2$ outside the first one, formed of void points 0.

Figure 26:
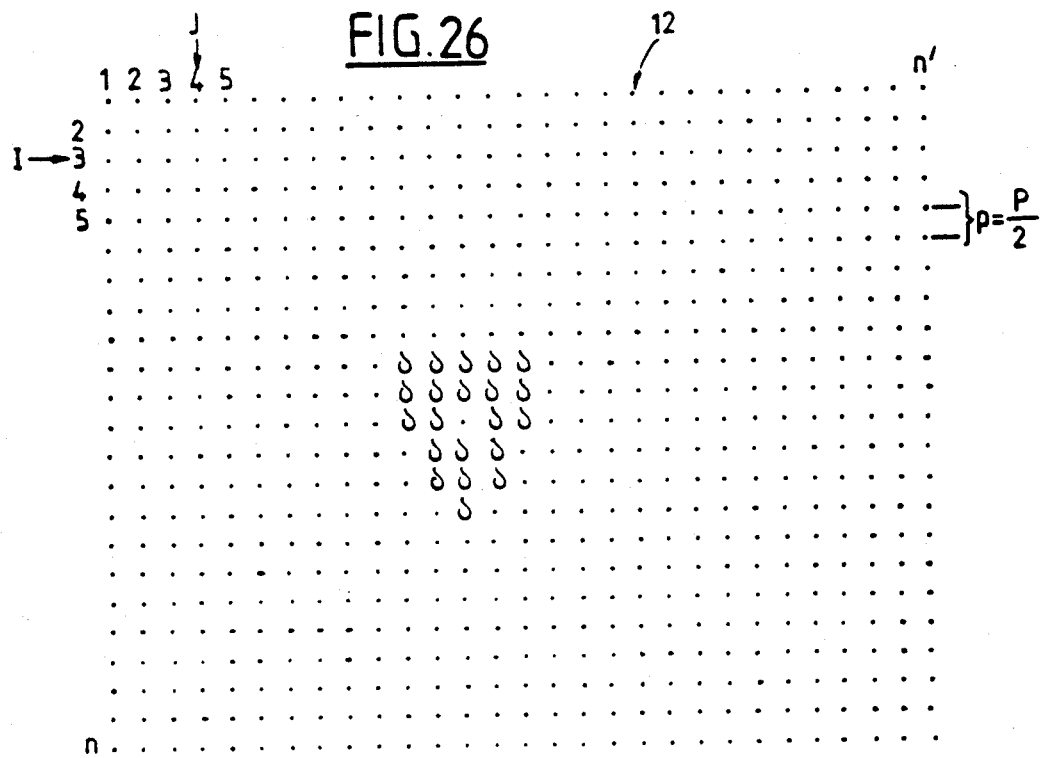
FIGS. 26 and 27 show the table proper to the islet profile according to the example of FIG. 22, after determination of the limit points (FIG. 26) and respectively of the inner and outer points (FIG. 27) of the islet profile.
Figure 27:
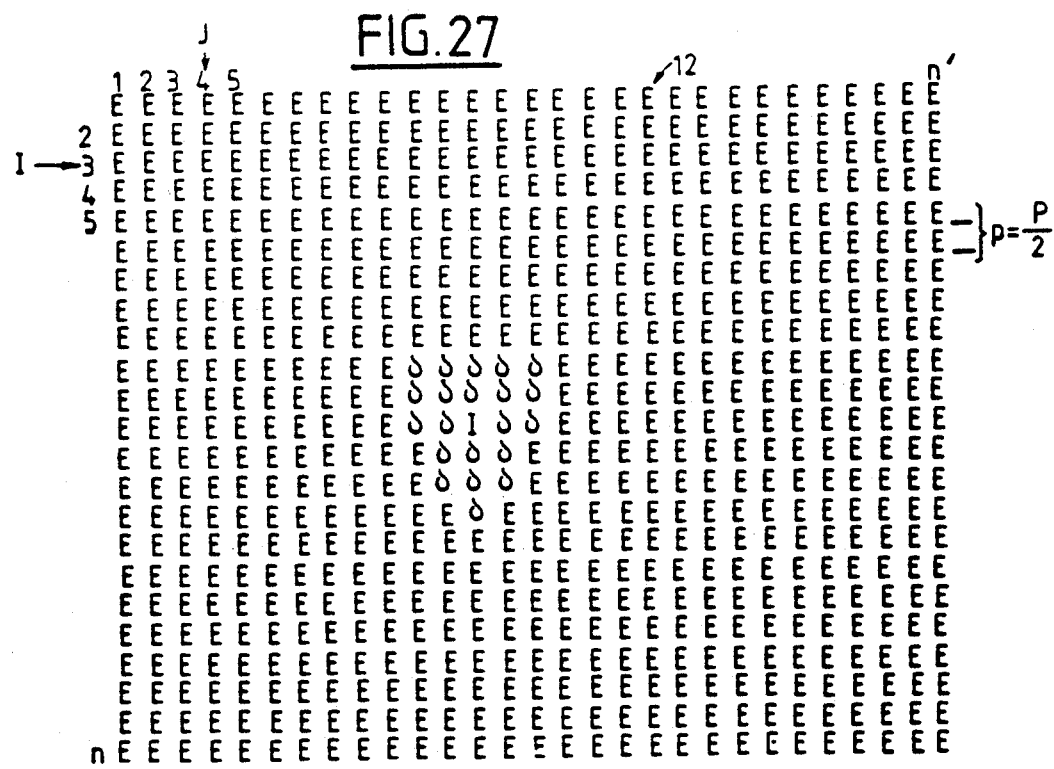

For the second profile considered, here the islet profile PI (FIG. 22), the limit points ∂, the inner points I and the outer points E of the islet profile are determined from the cross-ruling 10 in a way identical to that described in connection with that of the example of FIG. 5. Referring to FIG. 26, the intermediate table 12 has been shown proper to the islet profile PI after determination of the limit points ∂, and in FIG. 27 the same table 12 after determination of the inner points I and the outer points E.

Figure 28:
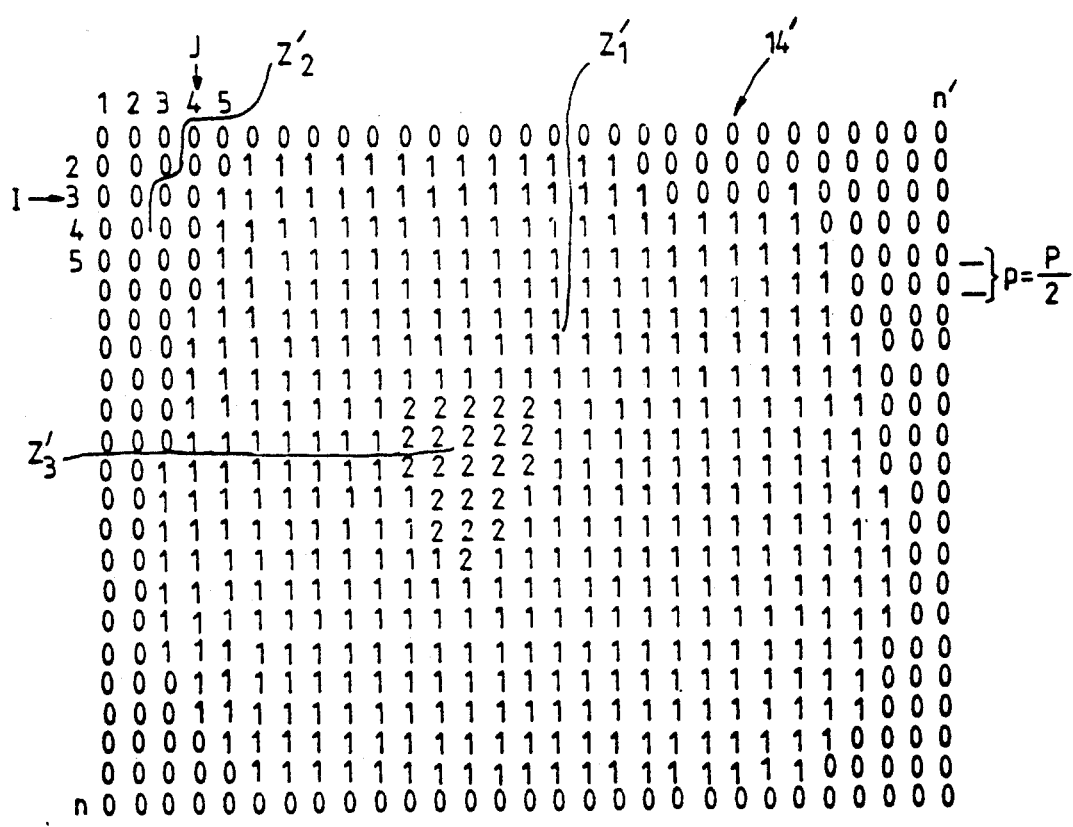
FIG. 28 shows the result table which is the image of the open pocket except for its wall and with the islet.

By applying the result algorithm, FIG. 3, from the result table 14' previously obtained (FIG. 25), each of the void points 0 of this result table 14' remains a void point 0 if the corresponding point in the intermediate table 12 (FIG. 27) proper to the islet profile is an outer point E, whereas each of the machinable points 1 of said result table 14' either remains a machinable point 1 if the corresponding point in the intermediate table 12 (FIG. 27) proper to the islet profile is an outer point E, or becomes a non machinable point 2 if the corresponding point in said table 12 is a limit point ∂ or an inner point I. At the end of processing of the islet profile PI, as shown in FIG. 28, the result table 14' obtained reproduces the result table 14' obtained after processing of the outer overall profile PPO of the open pocket (FIG. 25), but in which there appears in the first zone $Z'_1$ a third zone $Z'_3$ representative of the islet IL and formed of non machinable points 2.

Figure 29:
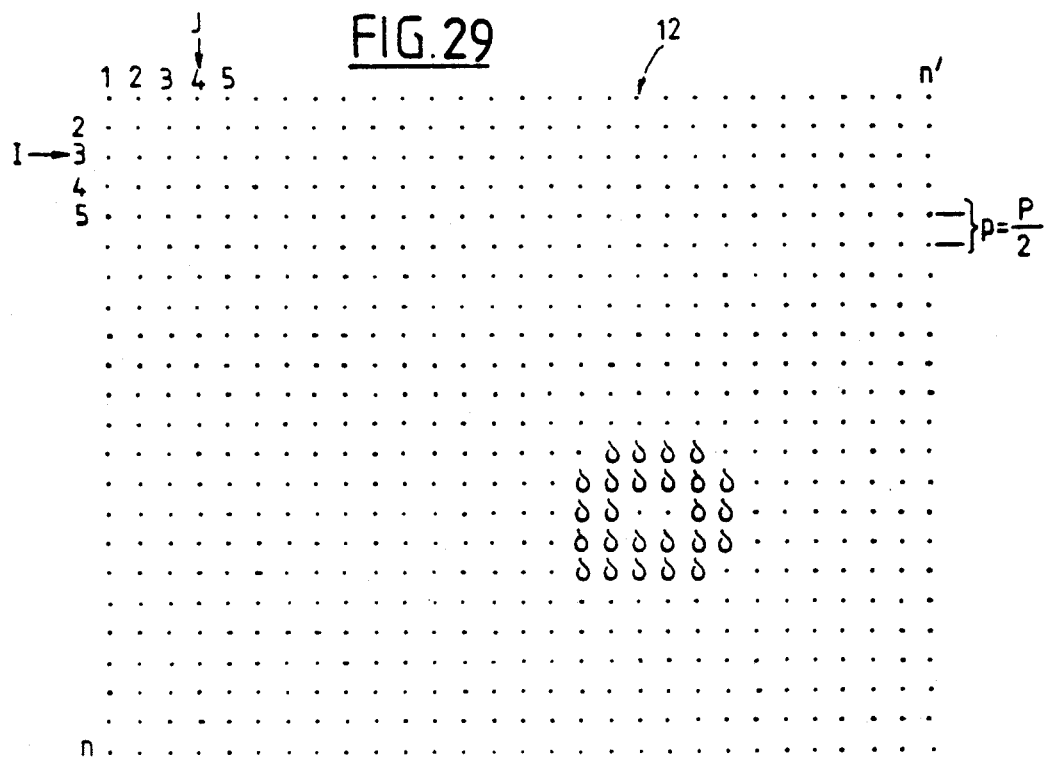
FIGS. 29 and 30 show the table proper to the recess profile according to the example of FIG. 22, after determination of the limit points (FIG. 29) and respectively of the inner and outer points (FIG. 30) of the recess profile.
Figure 30:
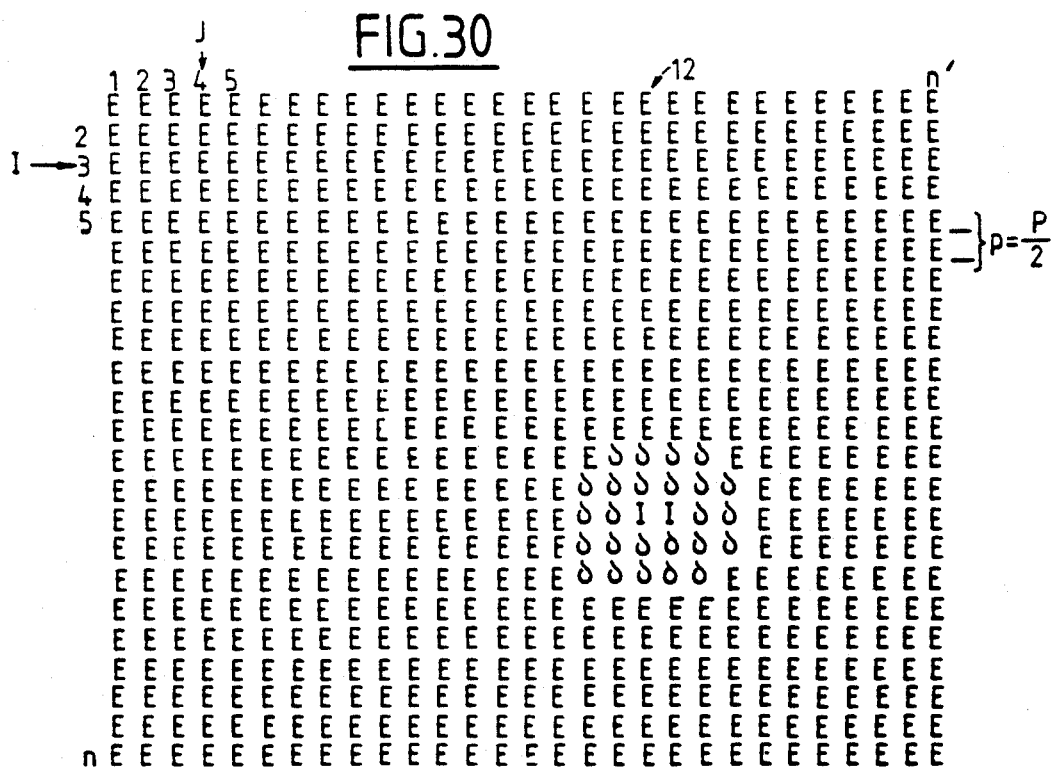

For the third profile considered, here the recess profile PE (FIG. 22), the limit points ∂, the inner points I and the outer points E of the recess profile PE are determined from the cross-ruling 10 in a way identical to that described in connection with the example of FIG. 5. In FIG. 29 has been shown the intermediate table 12 proper to the recess profile PE after determination of the limit points ∂ and in FIG. 30 the same table 12 after determination of the inner points I and of the outer points E.

Figure 31:
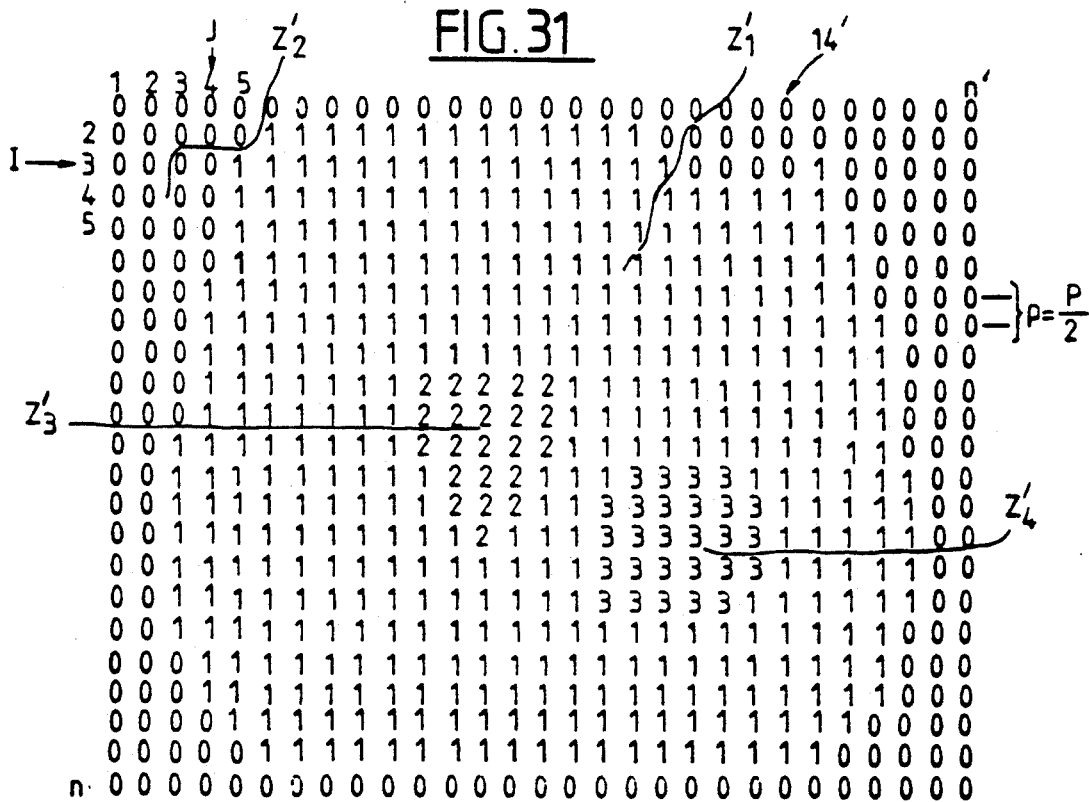
FIG. 31 shows the result table which is the image of the open pocket except for its wall, with islet and recess.

By applying the result algorithm (FIG. 3), from the result table 14' previously obtained (FIG. 28), each of the non machinable points 2 of this result table 14' remains a non machinable point 2, each of the void points 0 of said result table 14' remains a void point 0 if the corresponding point in the intermediate table 12 (FIG. 30) proper to the recess profile is an outer point E, whereas each of the machinable points 1 of said result table 14' either remains a machinable point 1 if the corresponding point in the intermediate table 12 (FIG. 30) proper to the recess profile is an outer point E, or becomes a void point 3 if the corresponding point in said table 12 is a limit point ∂ or an inner point I. At the end of processing of the recess profile PE, as shown in FIG. 31, the result table 14' obtained reproduces the result table 14' obtained after processing the outer overall profile PPO of the open pocket and of the islet profile PI (FIG. 28) but in which in the first zone Z'$_1$ there appears a fourth zone Z'$_4$ representative of recess EV and formed of the void points 3.

Figure 32:
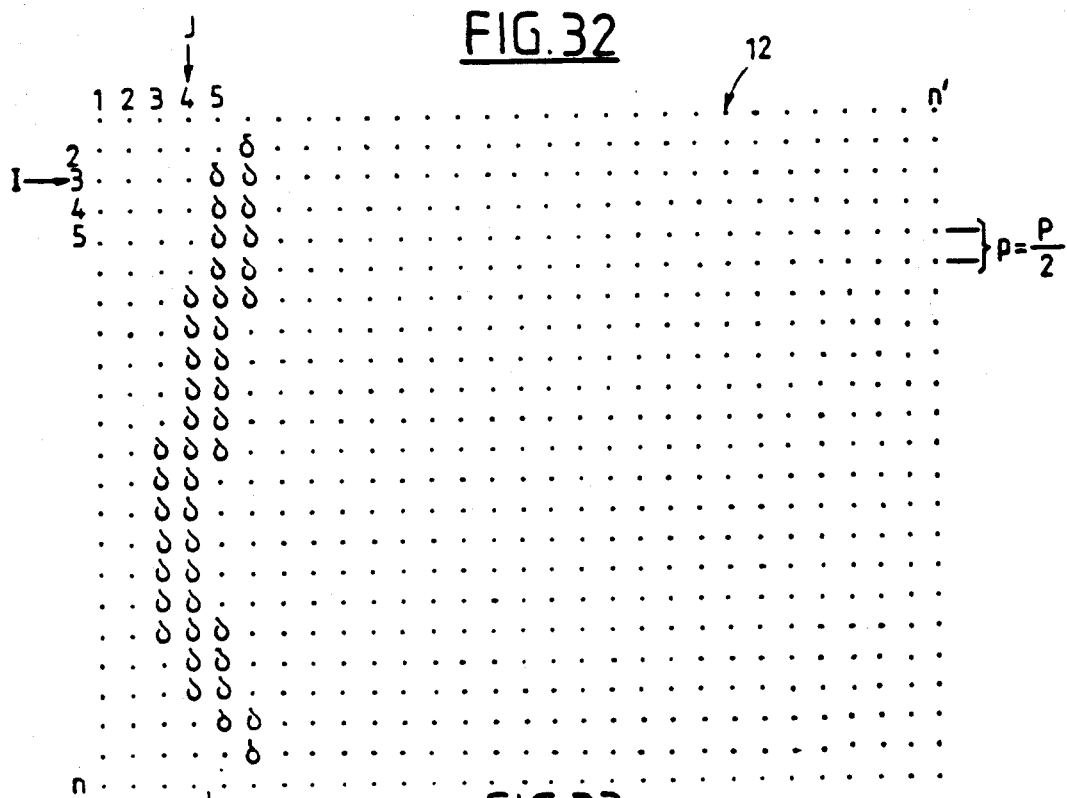
FIGS. 32 and 33 show the table proper to the wall profile of the open pocket according to the example of FIG. 22, after determination of the limit points (FIG. 32) and respectively of the outer points (FIG. 33) of the wall profile of the open pocket.

Finally, for the last profile considered, here the wall profile PPA of the open pocket (FIG. 22), the limit points ∂ are determined from the cross-ruling 10 in the same way as in the case of an islet. In FIG. 32 has been shown the intermediate table 12 proper to the wall profile PPA of the open pocket after determination of the limit points ∂.

Since the wall of the open pocket is considered as an islet of zero thickness, no inner point exists and the outer points E situated on each side of said wall of the open pocket are determined as before, which outer points E are the apices of the cross-ruling left unoccupied by the limit points ∂.

Figure 33:
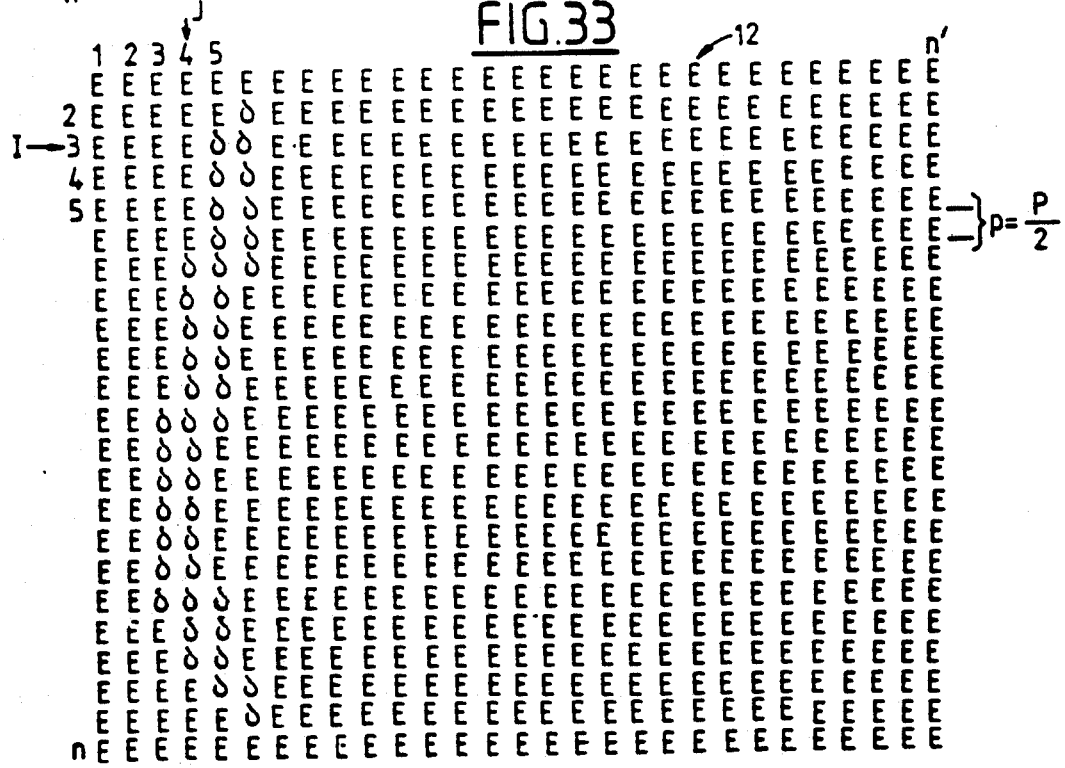

FIG. 33 shows the intermediate table 12 proper to the wall profile PPA of the open pocket after determination of the outer points E.

Again, by application of the result algorithm (FIG. 3), from the result table 14' previously obtained (FIG. 31), each of the non machinable points 2 of this result table 14' remains a non machinable point 2, each of the void points 0 and 3 of said result table 14' remains a void point 0 and, respectively 3, if the corresponding point in the intermediate table 12 (FIG. 33) proper to the wall profile of the open pocket is an outer point E, whereas each of the machinable points 1 of said result table 14' either remains a machinable point 1 if the corresponding point in the intermediate table 12 (FIG. 33) proper to the wall profile of the open pocket is an outer point E or becomes a non machinable point 4 if the corresponding point in said table 12 is a limit point ∂. At the end of processing of the wall profile PPA of the open pocket, as shown in FIG. 34, the result table 14' obtained reproduces the result table 14' obtained after processing the outer overall profile PPO of the open pocket, of the islet profile PI and of the recess profile PE (FIG. 31), but in which at the edge of the first zone Z'$_1$ there appears a fifth zone Z'$_5$ representative of the wall PA of the open pocket and formed of the non machinable points 4.

Thus, after processing the outer overall profile PPO of the open pocket, and of the islet PI, recess PE and wall PPA profiles of the open pocket, the final result table 14', FIG. 34, is formed of five zones, namely: zone Z'$_1$ all the machinable points 1, which is bordered on one side by zone Z'$_5$ all the non machinable points 4 representative of the wall of the open pocket, and which includes zone Z'$_3$ all the non machinable points 2 representative of the islet as well as the zone Z'$_4$ all the void points 3 representative of the islet and zone Z'$_2$, external to zone Z'$_1$ and Z'$_5$ all the void points 0. This result table 14' forms then an image of the actual zone to be machined in this case zone Z'$_1$.

Then, from the result table 14' of FIG. 34, the profiles are shifted in the way already described, consisting:

for zone Z'$_5$ (non machinable points 4), in eliminating the machinable points 1 from zone Z'$_1$ whose distance to the non machinable points 4 is less than the radius of the tool, then in transforming these machinable points 1 into non machinable points 4;

for zone Z'$_3$ (non machinable points 2), in eliminating the machinable points 1 from zone Z'$_1$ whose distance to the non machinable points 2 is less than the radius of the tool, then transforming these machinable points 1 into non machinable points 2;

and then for zone Z'$_1$ (machinable points 1), in eliminating the void points 0 from zone Z'$_2$ as well as the void points 3 from zone Z'$_4$ whose distance to the machinable points 1 is less than the radius of the tool, then in transforming these void points 0 and 3 into machinable points 1.

In FIG. 35 the result table 14' has been illustrated with five modified zones Z'$_1$, Z'$_2$, Z'$_3$, Z'$_4$ and Z'$_5$ once shift effected.

As we saw above in connection with the example of FIG. 5, the result table 14' after the shift (FIG. 35) is then processed by giving it a pitch equal to the pass setting P. The passage from the result table 14' after the shift (FIG. 35) to the result table 14' of pitch P (FIG. 36) takes place by taking into account only one line out of two and one column out of two, the second line and the second column of the result table being, preferably in this example, subtracted first.

Then the machinable points 1 in zone Z'$_1$ of the result table 14' of FIG. 36 are coded using the same coding algorithm as that described previously in relation with the example of FIG. 5. FIG. 37 shows the result table 14' after coding of the machinable points, the starting point for coding being point A' (i=0, j=4) coded at level 1 and the next point being the point B' (i=0, j=5) coded at level 2.

Figure 38:
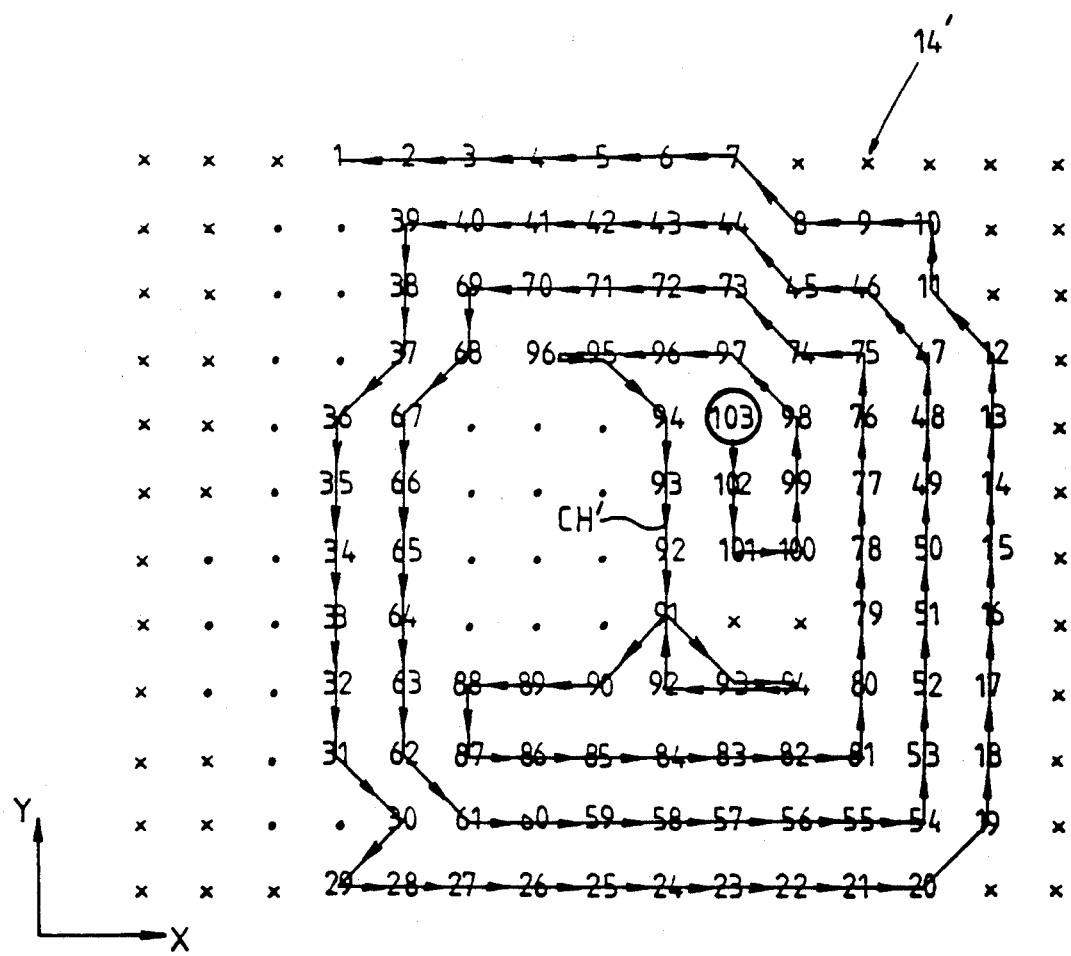
FIG. 38 shows the path of the tool through the coded points of FIG. 37.

Then the coded points of FIG. 37 are machined using the same machining algorithm as that described previously in relation to the example of FIG. 5. FIG. 38 shows the result table 14' in which is traced the path CH' of the tool after application of the machining algorithm.

In this example, FIG. 38, it will be noted that the point of level 95 is first of all a "waiting" point then becomes a "machined" point after passing through the point of level 96; similarly, the points with respective levels 91 and 93 are first of all "waiting" points, then become "machined" points after passage, in so far as the point of level 93 is concerned, through the point of level 94 and, in so far as the point 91 is concerned, through the point of level 92, the tool then continuing its path through the point of level 90.

Referring to FIGS. 39 to 52, the same procedure as described previously in relation with the example of FIG. 5 (pocket containing an islet and a recess) will be taken up again using the same example applied this time, with reference to FIG. 39, to a surfacing referenced SU containing the islet IL (with profile PI) and the recess EV (with profile PE).

In the example of FIG. 39, the surfacing SU is defined externally by the contour of the workpiece and has in the plane (X-Y) an outer profile referenced PS formed by the edge of the workpiece.

The three profiles PS, PI and PE respectively of the surfacing SU, of islet IL and recess EV, are each defined in the same "PIECE" program and are each formed of a succession of straight line and/or arc of a circle segments.

In the method of the invention, the cross-lining 10, FIG. 39, is formed first of all extending in the plane (X-Y) over the whole surfacing SU in a way identical to that described previously in relation with the example of FIG. 5 (pocket with islet and recess).

Then, each of the three profiles considered PS, PI and PE are quantified successively in any processing order, and the table called result table is elaborated which is the image of the actual zone to be machined.

By way of example, the surfacing profile PS will be dealt with first of all, secondly the islet profile PI and finally the recess profile PE.

Figure 41:
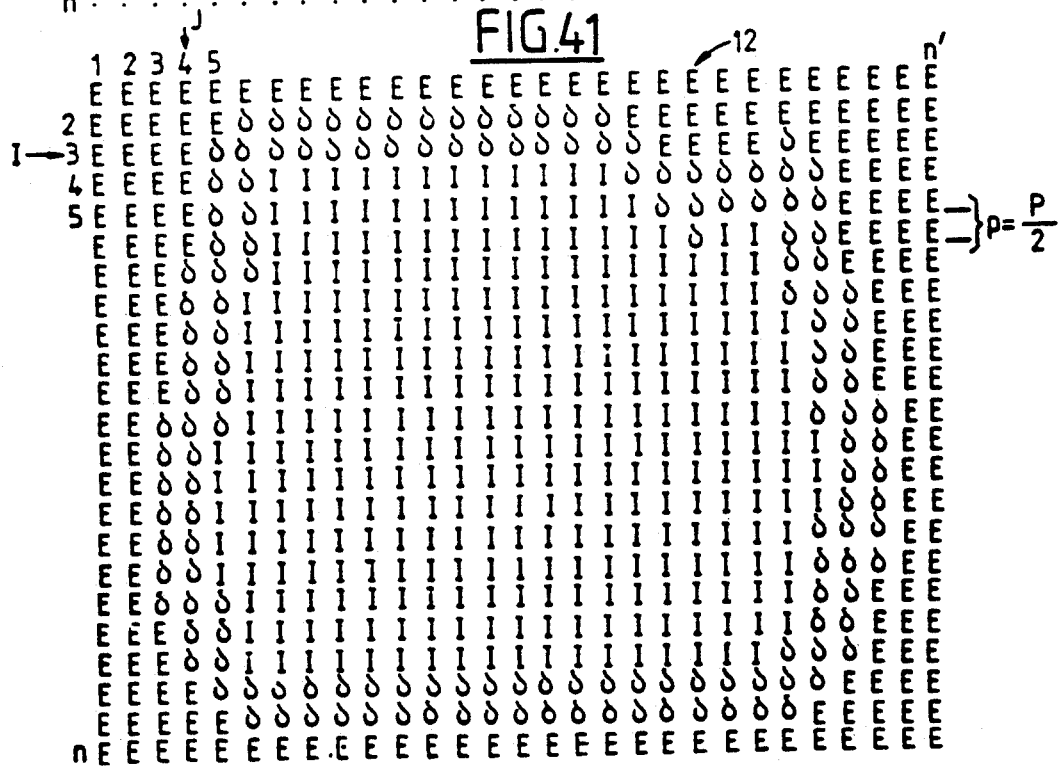

According to the flowchart of FIG. 2, for the first profile considered, here the surfacing profile PS (FIG. 39), and starting from the cross-lining 10, in a way identical to that described previously in relation with the example of FIG. 5 (pocket with islet and recess), on the one hand, the limit points $\partial$ of the surfacing profile PS are determined, which limit points $\partial$ are then transferred as before into the intermediate table 12 (FIG. 40) previously initialized at void, and on the other hand the inner I and outer E points of the surfacing profile PS are determined and then transferred to the intermediate table 12 proper to the surfacing profile, as seen in FIG. 41.

Still according to the flowchart of FIG. 2, the result algorithm (FIG. 3) previously explained is then applied, the nature of the profile being processed in the example of FIG. 39 being surfacing, an islet or a recess, then each of the resultant states is transferred to the result table in this case in the form:

- of a first same given character, for example the value 1, if the resultant state is a "machinable" state, whatever the profile considered;
- of a same second given character different from the first one, for example with the value 0, if the resultant state is a "void" state in the case where the profile considered is the surfacing profile;
- of a third same given character different from the second one, for example the value 2, if the resultant state is a "non machinable" state in the case where the profile considered is the islet profile;
- of a same fourth given character different from the third one, for example the value 3, if the resultant state is a "void" state in the case where the profile considered is the recess profile.

Figure 42:
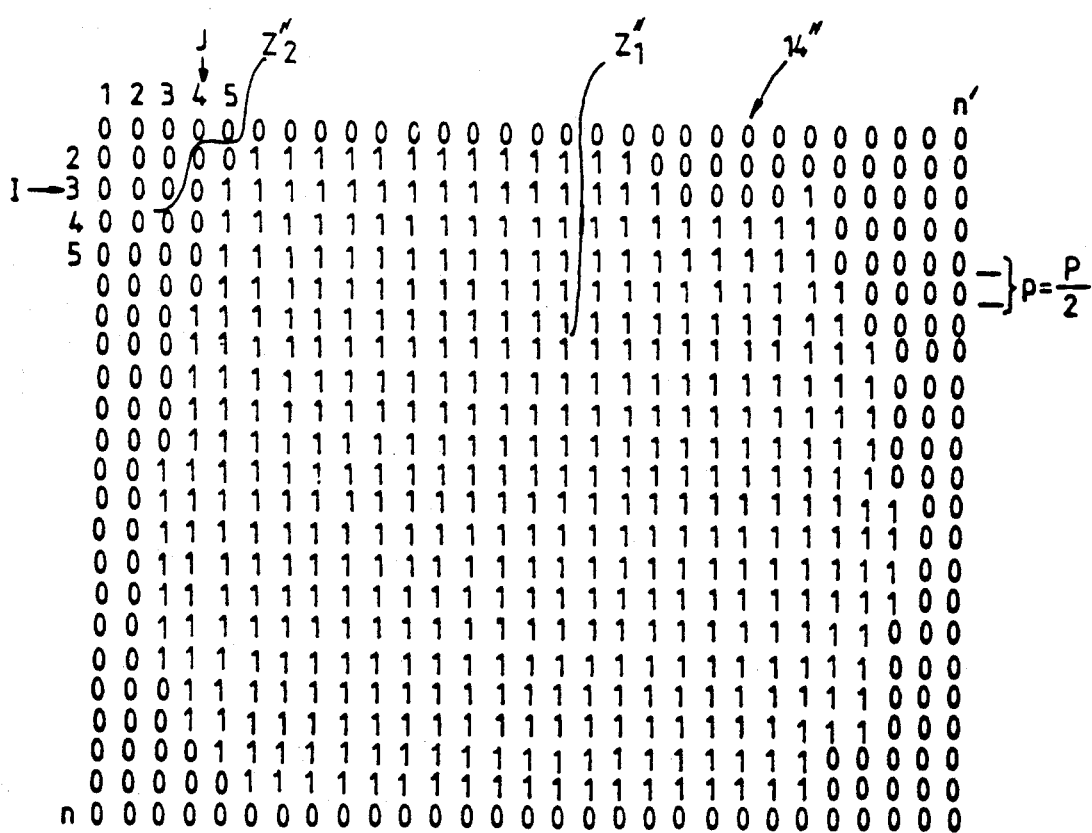
FIG. 42 shows the result table which is the image of the surfacing.

In the example of FIG. 39 in which the surfacing profile PS is processed first by application of the result algorithm (FIG. 3), and from a result table previously initialized by placing all its points at the "machinable" state represented by the value 1, each of these machinable points 1 of the result table either remains a machinable point 1 if the corresponding point in the intermediate table 12 (FIG. 41) proper to the surfacing profile is a limit point $\partial$ or an inner point I, or becomes a void point 0 if the corresponding point in said table 12 is an outer point E. At the end of processing of the surfacing profile, as shown in FIG. 42, the result table obtained, designated at 14", is formed of a first zone $Z''_1$ representative of the surfacing and formed of the machinable points 1, and a second zone $Z''_2$, outside the first one, formed of void points 0.

Figure 43:
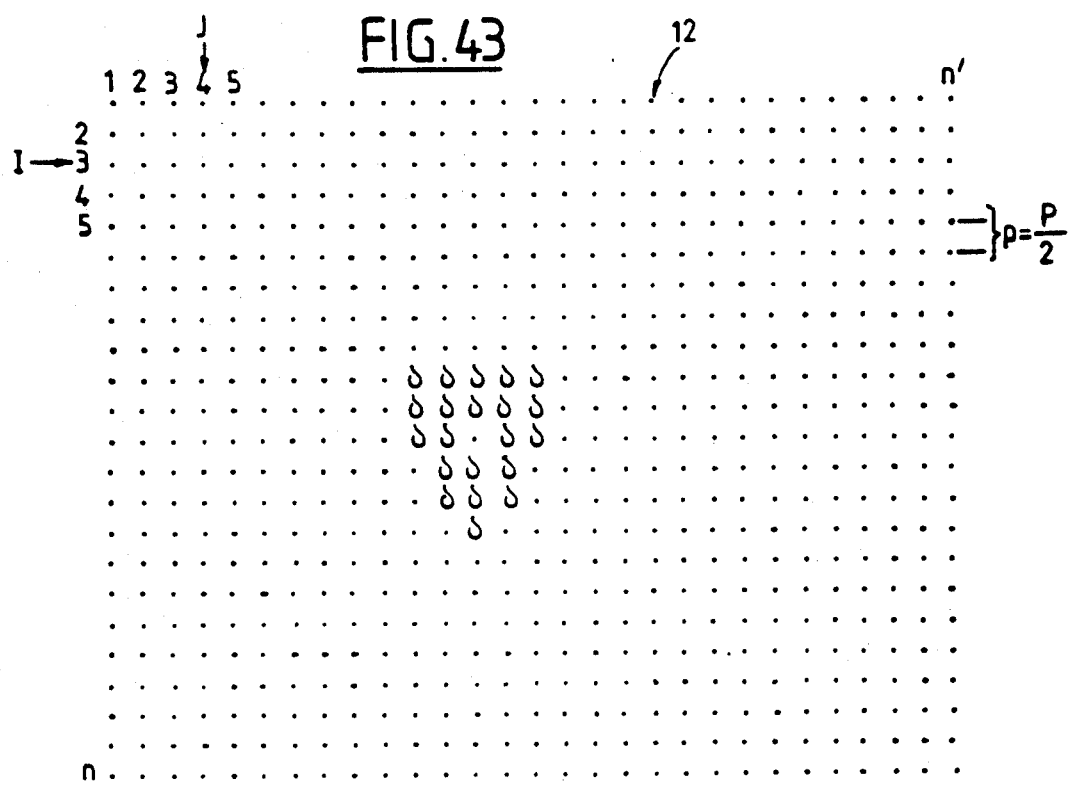
FIGS. 43 and 44 show the table proper to the islet profile according to the example of FIG. 39, after determination of the limit points (FIG. 43) and respectively of the inner and outer points of the islet profile (FIG. 44)
Figure 44:
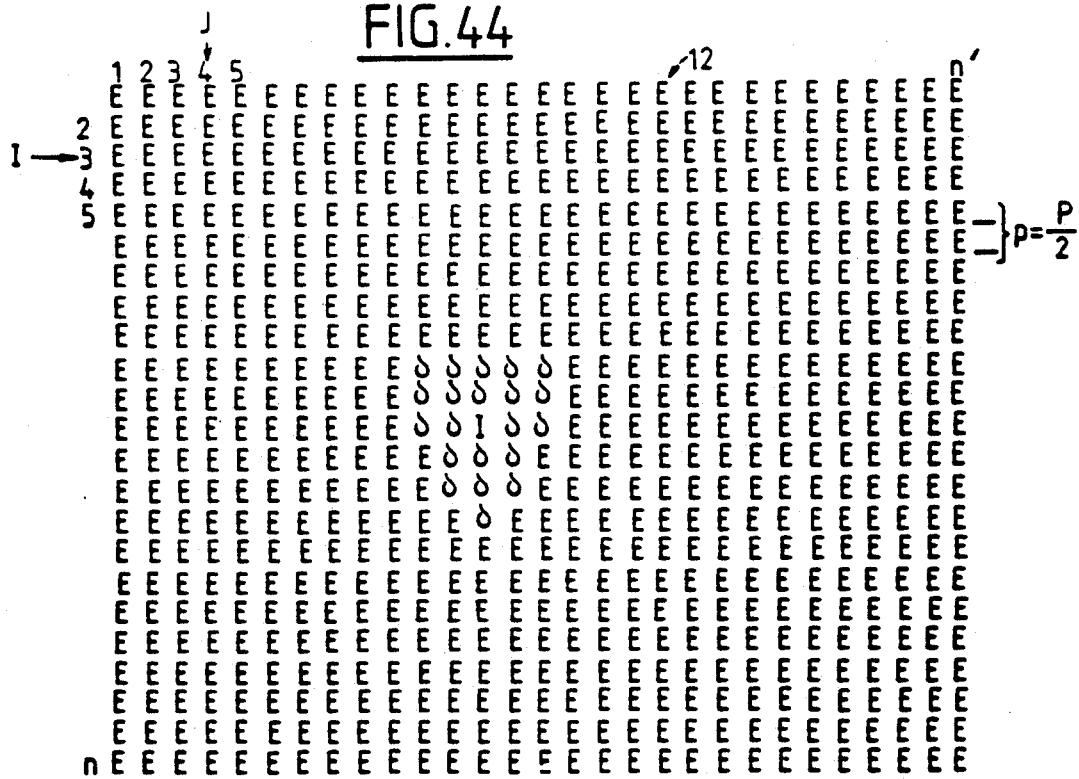

For the second profile considered, here the islet profile PI (FIG. 39), the limit points $\partial$, the inner points I and the outer points E of the islet profile are determined from the cross-lining 10 in a way identical to that described previously in relation with the example of FIG. 5. Referring to FIG. 43, the intermediate table 12 has been shown proper to the islet profile PI after determination of the limit points $\partial$, and in FIG. 44, the same table 12 after determination of the inner points I and the outer points E.

Figure 45:
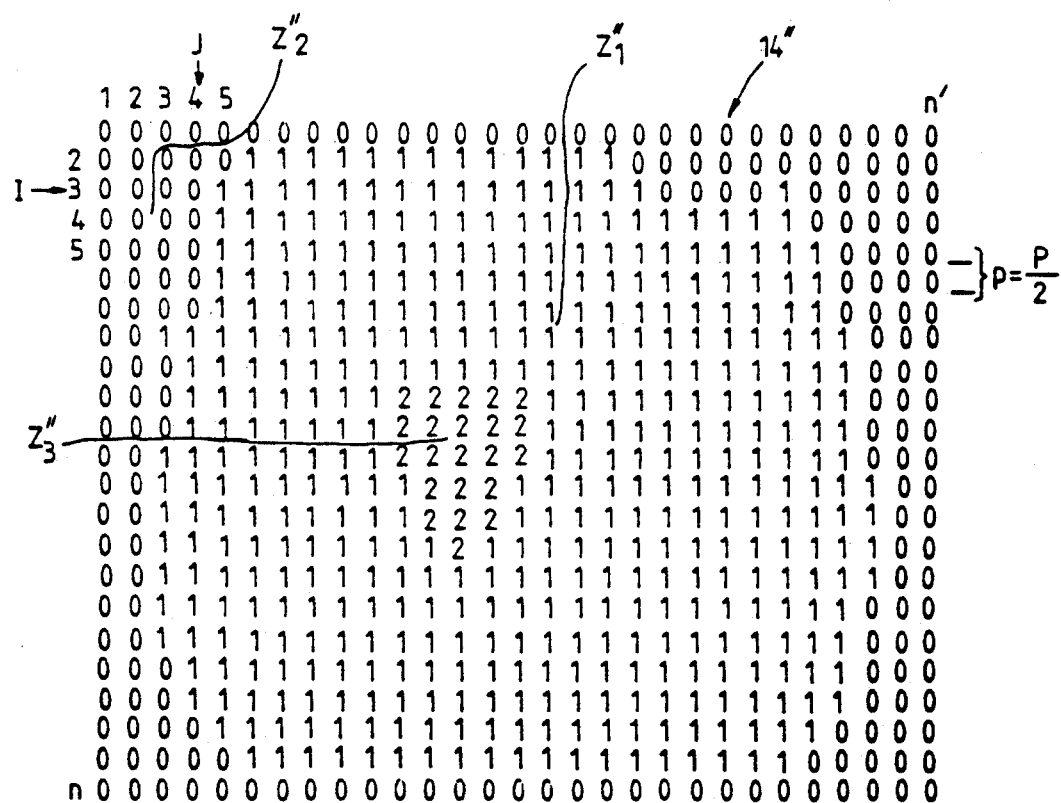
FIG. 45 show the result table which is the image of the surfacing with islet.

By application of the result algorithm, FIG. 3, from the result table 14" previously obtained (FIG. 42), each of the void points 0 of this result table 14" remains a void point 0 if the corresponding point in the intermediate table 12 (FIG. 44) proper to the islet profile is an outer point E, whereas each of the machinable points 1 of said result table 14" either remains a machinable point 1 if the corresponding point in the intermediate table 12 (FIG. 44) proper to the islet profile is an outer point E, or becomes a non machinable point 2 if the corresponding point in said table 12 is a limit point $\partial$ or an inner point I. At the end of processing of the islet profile PI, as shown in FIG. 45, the result table 14" obtained reproduces the result table 14" obtained after processing of the surfacing profile PS (FIG. 42), but in which, in the first zone $Z''_1$, there appears a third zone $Z''_3$ representative of the islet IL and formed of the non machinable points 2.

Figure 46:
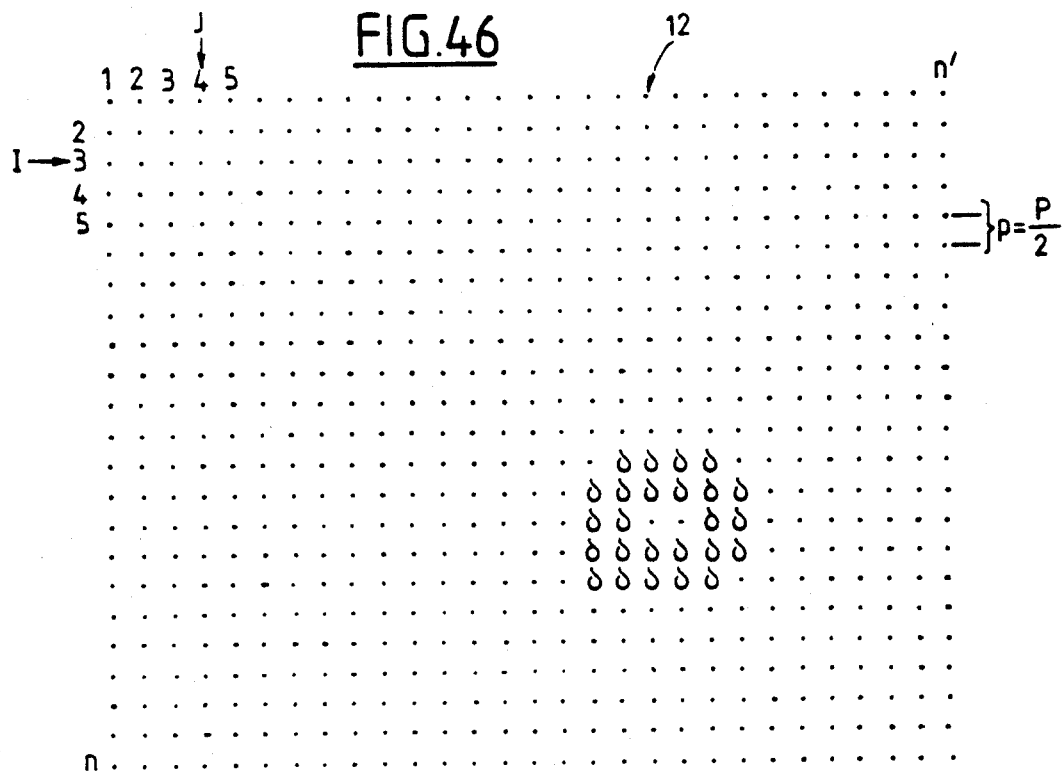
FIGS. 46 and 47 show the table proper to the recess profile according to the example of FIG. 39, after determination of the limit points (FIG. 46) and respectively of the inner and outer points (FIG. 47) of the recess profile.
Figure 47:
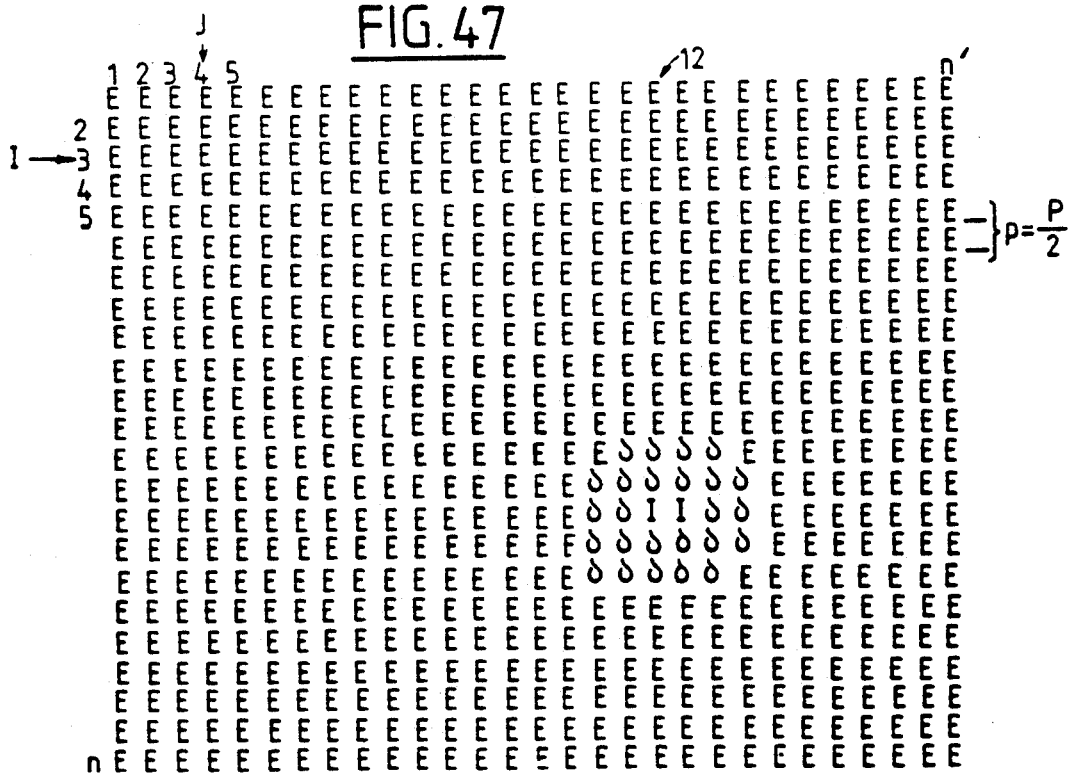

Finally, for the last profile considered, here the recess profile PE (FIG. 39), the limit points $\partial$, the inner points I and the outer points E of the recess profile PE are determined from the cross-lining 10 in a way identical to that described previously in relation with the example of FIG. 5. In FIG. 46 has been shown the intermediate table 12 proper to the recess profile PE after determination of the limit points $\partial$ and in FIG. 47 the same table 12 after determination of the inner points I and the outer points E.

Again, by application of the result algorithm (FIG. 3), from the result table 14" previously obtained (FIG. 45), each of the non machinable points 2 of this result table 14" remains a non machinable point 2, each of the void points 0 of said result table 14" remains a void point 0 if the corresponding point in the intermediate table 12 (FIG. 47) proper to the recess profile is an outer point E, whereas each of the machinable points 1 of said result table 14" either remains a machinable point 1 if the corresponding point in the intermediate table 12 (FIG. 47) proper to the recess profile is an outer point E or becomes a void point 3 if the corresponding point in said table 12 is a limit point $\partial$ or an inner point I. At the end of processing of the recess profile PE, as shown in FIG. 48, the result table 14" obtained reproduces the result table 14" obtained after processing of the surfacing PS and islet PI profiles (FIG. 45), but in which, in the first zone $Z''_1$, there appears a fourth zone $Z''_4$ representative of the recess EV and formed of the void points 3.

Thus, after processing of the surfacing PS, islet PI and recess PE profiles, the final result table 14" (FIG. 48) is formed of four zones, namely zone $Z''_1$ all the machinable points 1 and including zone $Z''_3$ all the non machinable points 2 representative of the islet as well as zone $Z''_4$ all the void points 3 representative of the recess and zone $Z''_2$ outside zone $Z''_1$, all the void points 0. This result table 14" forms then an image of the actual zone to be machined, in this case zone $Z''_1$.

Figures 48, 49:
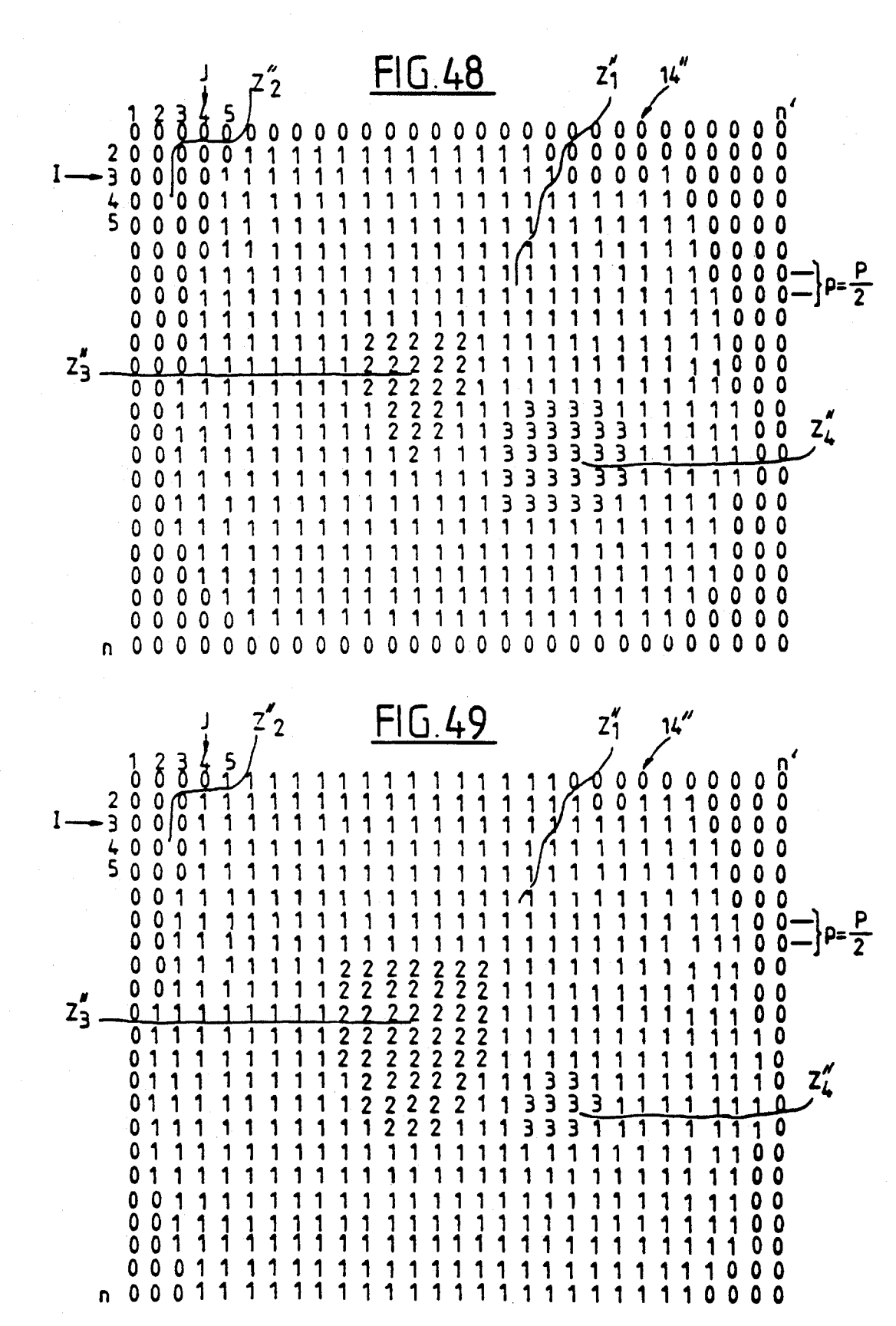

Then, from the result table 14" of FIG. 48, the profiles are shifted in the way already described, which consists:

- for zone $Z''_3$ (non machinable points 2), in eliminating the machinable points 1 from zone $Z''_1$ whose distance to the non machinable points 2 is less than the radius of the tool, then in transforming these machinable points 1 into non machinable points 2;
- and then for zone $Z''_1$ (machinable points 1), in eliminating the void points 0 from zone $Z''_2$ as well as the void points 3 from zone $Z''_4$ whose distance to the machinable points 1 is less than the radius of the tool, then in transforming these void points 0 and 3 into machinable points 1.

In FIG. 49 has been shown the result table 14" with four modified zones Z"$_1$, Z"$_2$, Z"$_3$ and Z"$_4$, once the shift effected.

As we saw above in connection with the example of FIG. 5, the result table 14" after the shift (FIG. 49) is then processed by giving it a pitch equal to the pass setting P. The passage from the result table 14" after the shift (FIG. 49) to the result table 14" of pitch P (FIG. 50) takes place by taking into account only one line out of two and one column out of two, the second line and the second column of the result table being, preferably in this example, subtracted first.

Then the machinable points 1 of zone Z"$_1$ of the result table 14" of FIG. 50 are coded using the same coding algorithm as the one described previously in relation with the example of FIG. 5. FIG. 51 shows the result table 14" after coding of the machinable points, the starting point for coding being point A" (i=0, j=3) coded at level 1 and the next point being point B" (i=0, j=4) coded at level 2.

Figure 52:
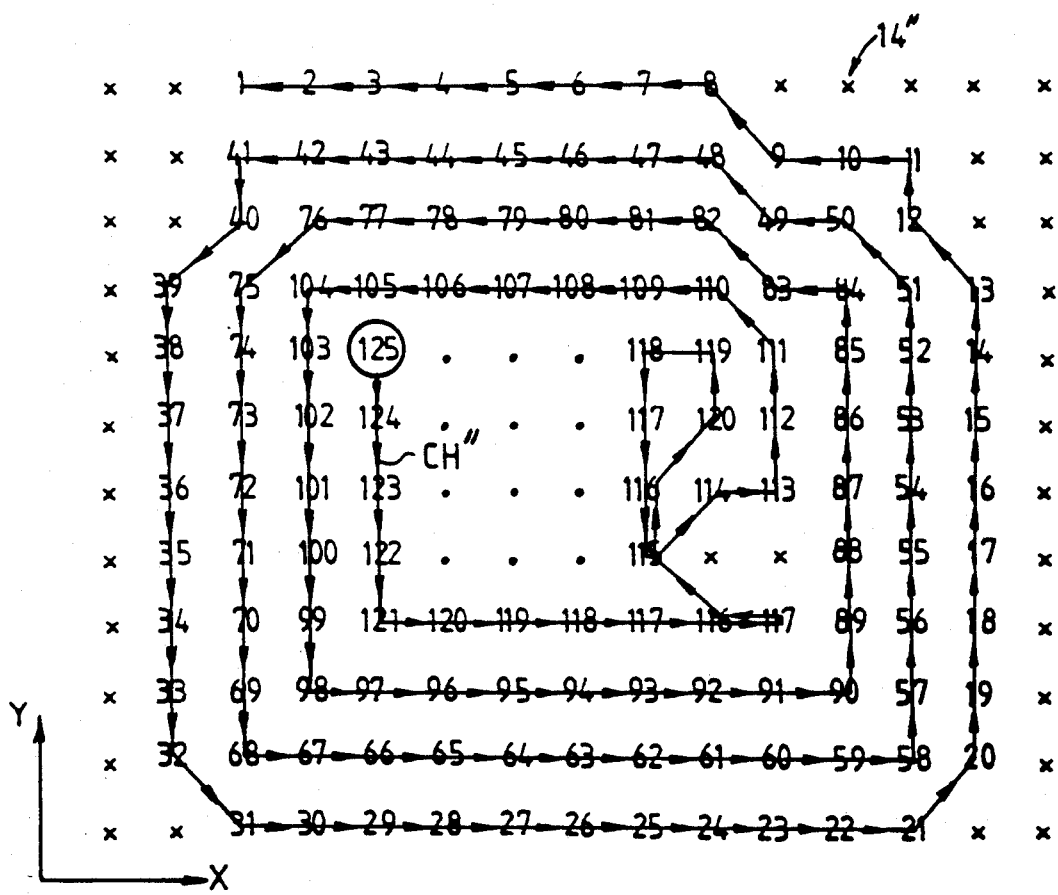
FIG. 52 shows the path of the tool through the coded points of FIG. 51.

Finally, the coded points of FIG. 51 are machined using the same machining algorithm as that described previously in relation with the example of FIG. 5. FIG. 52 shows the result table 14" in which is traced the path CH" of the tool after application of the machining algorithm.

In this example, FIG. 52, it will be noted that the point of level 116 is first of all a "waiting" point, then becomes a machined point after passage through the point of level 117; similarly, points 115 and 116 are first of all "waiting" points then become machined points after passing through the points of respective levels 120, 119, 118 and 117, the tool continuing its path from the "machined" point of level 115 through the point of level 114.

It should be noted that the method for determining the tool path in accordance with the invention is quite particularly advantageous in the case of pockets, open pockets, or surfacings with straight edges, for the path of the tool is then the same for all the pass planes. In the case of pockets, open pockets or surfacings with slanting edges, it is on the other hand necessary to determine the path of the tool for each pass plane by implementation of the method.

What is claimed is:

1. A method for automatically determining the tool path in plane machining of a pocket having in a plane X-Y a closed outer profile formed or a succession of straight line and/or arc of a circle segments, comprising the following steps:

i. forming a cross-ruling extending in the plane X-Y over the whole pocket with a same line and column pitch which depends on the diameter of the tool, the apices of the cross-ruling being referenced by line and column indices;

ii. quantifying the pocket profile, the quantifying step consisting:

from the cross-ruling, in determining by their respective line and column indices limit points which are the apices of the cross-ruling the closest to the pocket profile, obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to the pocket profile and having the same dimensions and the same line and column pitch as the cross-ruling in the same indexed line and column positions as those of the cross-ruling, respectively the limit, inner and outer points of the profile, representing them by means of respective identification symbols;

iii. caculating a result table which is the image of the pocket, having the same dimensions and the same line and column pitch as the intermediate table, comprising a first zone representative of the pocket and formed of machinable points to each of which is assigned a same first given character and which correspond to the inner points of the pocket profile, and a second zone external to the first one and formed of non machinable points to each of which is assigned a same second given character different from the first one and which correspond to the limit and outer points of the pocket profile;

iv. shifting the pocket profile, the shifting step starting from said result table, in determining for each non machinable point of the second zone of the result table the machinable points of the first zone whose distance to said non machinable points is less than the radius of the tool, and in transforming said machinable points into non machinable points to which the same second character is assigned;

v. coding the machinable points of the first zone of the result table once said shifting step has been carried out, said coding step consisting in:

assigning to any first point of said zone called starting point, a level represented by the integer 1;

assigning to a second point adjacent the starting point and situated on the same line or the same column as the latter a level represented by the integer 2;

passing then from a coded current point to the next point by searching among its neighbors to see if a non coded point exists, this search taking place from the point which was coded prior to the current point and turning about the current point in the same predetermined search direction; if the non coded point exists, assigning thereto a level represented by the integer n+1 if the level assigned to the current is represented by the positve integer n; if the non coded point does not exist, "block-tracking" unitl a coded point is found which has at least one non coded neighbor, which point becomes the current point, the end of coding occurring when the "backing-tracking" has been carried out as far as the starting point and when the latter has no non coded neighbor;

vi. machining the first zone of the result table by effecting the passage of the tool through each of the points coded in the preceding step so as to obtain a succession of linear movements of the tool which are oriented either parallel to the axes of the plane X-Y or at 45° with respect to said axes, said machining step consisting, specifying at the outset that all the coded points are "non machined" points:

in determining a first coded point called "beginning of machining" point;

for passing successively from a current point to the next point, said current point being at the start the "beginning of machining" point, in searching among its neighbors for the highest level of "machined" point and in determining whether said level is less or greater than that of the current point; if it is less, considering the current point as a "machined" point over which the tool shall not pass again; if it is greater, in considering the current point as a "waiting" point over which the tool may pass again.

2. A method as claimed in claim 1, wherein the step of calculating the result table consists, starting with the result table all of whose points are in the "machinable" state, in applying an algorithm for determing the resultant state—"machinable" or "non machinable"—which each of the points of the result table takes on depending on whether the corresponding point at the same indexed position in the intermediate table proper to the pocket profile is a limit, inner or outer point, and in transferring each of the resultant states to the result table in the form of a same first character if the resultant state is a "machinable" state and in the form of the same second character if the resultant state is a "non machinable" state.

3. A method as claimed in claim 1, wherein the starting point for coding consists of a machinable point located close to the edge of the pocket and forms an end of machining point, whereas the "beginning of machining" point consists of the highest level coded point.

4. A method for automatically determining the tool path in plane machining of a pocket containing at least one islet and/or at least one recess, the pocket and the islet and/or the recess each having in a plane X-Y a closed outer profile formed of a succession of straight line and/or arc of a circle segments, comprising the following steps:

i. forming a cross-ruling extending in the plane X-Y over the whole pocket with a same line and column pitch which depends on the diameter of the tool, the apices of the cross-ruling being referenced by line and column indices;

ii. quantifying the pocket, islet and/or recess profiles, the quantifying step consisting:

for each of said profiles and starting from the same cross-ruling, in determining by their respective line and column indices limit points which are the apices of the cross-ruling the closest to the profile obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to each of said profiles and having the same dimensions and the same line and column pitch as the cross-ruling, at the same indexed line and column positions as those of the cross-ruling, respectively the limit, inner and outer points of the profile representing them by respective identification symbols;

iii. calculating a result table which is the image of the pocket-islet and/or recess assembly, having the same dimensions and the same line and column pitch as the intermediate table, comprising a first zone representative of the pocket and formed of machinable points to each of which is assigned a same first given character and which correspond to the inner points of the pocket profile, a second zone external to the first one and formed of non machinable points to each of which is assigned a same second given character different from the first one and which correspond to the limit and outer points of the pocket profile and, inside the first zone, a third zone representative of the islet and formed of non machinable points to each of which is assigned a same third given character different from the second one and which correspond to the limit and inner points of the islet profile and/or a fourth zone representative of the recess and formed of void points to each of which is assigned a same fourth given character different from the third one and which correspond to the limit and inner points of the recess profile;

iv. shifting each of the profiles, the shifting step consisting, starting from said result table:

for the pocket profile, in determining for each non machinable point of the second zone of the result table, the machinable points of the first zone whose distance to said non machinable point is less than the radius of the tool, and in transforming said machinable points into non machinable points to which the same second character is assigned;

for the islet profile, in determining for each non machinable point of the third zone of the result table, the machinable points of the first zone whose distance to said non machinable point is less than the radius of the tool, and in transforming these machinable points into non machinable points to which the same third character is assigned;

for the recess profile, in determining for each machinable point of the first zone of the result table, the void points of the fourth zone whose distance to said machinable point is less than the radius of the tool, and in transforming these void points into machinable points to which the same first character is assigned;

v. coding the machinable points of the first zone of the result table once said shifting step has been carried out, said coding step consisting in:

assigning to any first point of said zone, called starting point a level represented by the integer 1;

assigning to a second point adjacent the starting point and situated on the same line or the same column as the latter a level represented by the integer 2;

passing then from a coded current point to the next point by searching among its neighbors to see if a non coded point exist is, said searching taking place from the point which was coded prior to the current point and turning about the current point in the same predermined search direction; if the non coded point exists, assigning thereto a level represented by the integer $n+1$ if the level assigned to the current point is represented by the positive integer n; if the non coded point does not exist, "back-tracking" until a coded point is found which has at least one non coded neighbor, which point becomes the current point, the end of coding occurring when the "backing-tracking" has been carried out as far as the starting point and when the latter has no non coded neighbor;

vi. machining the first zone of the result table by effecting the passage of the tool through each of the points coded in the preceding step so as to obtain a succession of linear movements of the tool which are oriented either parallel to the axes of the plane X-Y or at 45° with respect to said axes, said machining step consisting, specifying at the outset that all the coded points are "non machined" points:

in determining a first coded point called "beginning of machining" point;

for passing successively from a current point to the next point, said current point being at the start the "beginning of machining" point, in searching among its neighbors for the highest level "non machined" point and in determining whether said level is less or greater than that of the current point; if it is less, considering the current point as a "machined" point over which the tool shall not pass again; if it is greater, in considering the current point as a "waiting" point over which the tool may pass again.

5. The method as claimed in claim 4, wherein the step of calculating the result table consists, using an algorithm which, knowing the preceding state—"machinable" or "non machinable" or "void" which each of the points of the result table takes, determines the resultant state—"machinable", "non machinable" or "void"—which each of said points of the result table takes on according to whether the profile is a pocket, islet or recess profile, and whether the corresponding point at the same indexed position in the intermediate table proper to the profile is a limit, inner or outer point, in applying said algorithm successively for each of the profiles starting for the first profile form the result table in which all the points are at the "machinable" state and in transferring each of the resultant states to the result table in the form of the same first character if the resultant state is a "machinable" state whatever the profile is, and in the form of the second same character if the resultant state is a "non machinable" state in the case where the profile is a pocket profile, in the form of the third same character if the resultant state is a "non machinable" state in the case where the profile is an islet profile and in the form of the same fourth character if the resultant state is a "void" state in the case where the profile is a recess profile.

6. The method as claimed in claim 4, wherein the starting point for coding consists of a machinable point located close to the edge of the pocket or of the islet and forms and "end of machining" point, whereas the "beginning of machining" point is formed by the highest level coded points.

7. A method for automatically determining the tool path in a plane machining of an open pocket to be machined in a workpiece, said open pocket being defined outwardly by at least one wall defining a region not to be machined and by at least one outer contour edge of the workpiece, and having in a plane X-Y an outer overall profile comprising that of the wall and that of the edge of the workpiece and being formed of a succession of straight line and/or arc of a circle segments, comprising the following steps:

i. forming cross-ruling extending in the plane X-Y over the whole open pocket with a same line and column pitch which depends on the diameter of the tool, the apices of the cross-ruling being referenced by line and column indices;

ii. (a) quantifying the outer overall profile of the open pocket, considering it as a surfacing profile, said quantifying step consisting:

starting from the same cross-ruling, in determining by their respective line and column indices, limit points which are the apices of the cross-ruling the closest to the outer overall profile of the open pocket, obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to the outer overall profile of the open pocket and having the same dimensions and the same line and column pitch as the cross-ruling, at the same indexed line and column positions as those of the cross-ruling, respectively the limit, inner and outer points of the profile, representing them by respective identification symbols;

(b) quantifying the wall profile of the open pocket, considering it as an islet profile of zero thickness, said quantifying step consisting:

starting from the same cross-ruling, in determining by their respective line and column indices, limit points which are the apices of the cross-ruling the closest to the wall profile of the open pocket, obtained by searching in each line and each column of the cross-ruling for the intersection with the profile and the points situated on each side of the profile which are outer points formed by the apices of the cross-ruling left unoccupied by the limit points;

in transferring to an intermediate table proper to the wall profile of the open pocket and having the same dimensions and the same line and column pitch as the cross-ruling, at the same indexed line and column positions as those of the cross-ruling, respectively the limit, inner and outer points of the profile, representing them by respective identification symbols;

iii. calculating a result table which is the image of the open pocket, having the same dimensions and the same line and column pitch as the intermediate table, comprising a first zone representative of the pocket except for its wall and formed of machinable points to each of which is assigned a same first given character and which correspond to the limit and inner points of the overall outer profile of the pocket, a second zone representative of the wall of the pocket bordering the first zone and formed of non machinable points to each of which is assigned a same second given character different from the first one and which correspond to the limit points of the wall profile of the pocket, a third zone outside the other two and formed of void points to each of which is assigned a same third given character different from the second one and which correspond to the outer points of the overall outer profile of the pocket;

iv. shifting the pocket profile, said shifting step consisting, starting from said result table:

in determining, for each non machinable point of the second zone of the result table, the machinable points of the first zone whose distance to said non machinable point is less than the radius of the tool, and in transforming these machinable points into non machinable points to which the same second character is assigned; and, for each machinable point of the first zone of the result table, the void points of the third zone whose distance to said machinable point is less than the radius of the tool and in transforming these void points into machinable points to which the same first character is assigned;

v. coding the machinable points of the first zone of the result table once the shift has been made, said coding step consisting in:

assigning to any first point of said zone, called starting point a level represented by the integer 1;

assigning to a second point adjacent the starting point and situated on the same line or the same column as the latter a level represented by the integer 2;

passing then from a coded current point to the next point by searching among its neighbors to see if a non coded point exists, said searching taking place from the point which was coded prior to the current point and turning about the current point in the same predetermined search direction; if the non coded point exists, assigning thereto a level represented by the integer n+1 if the level assigned to the current point is represented by the positive integer n; if the non coded point does not exit, "back-tracking" until a coded point is found which has at least one non coded neighbor, which point becomes the current point, the end of coding occurring when the "back-tracking" has been carried out as far as the starting point and when the latter has no non coded neighbor;

vi. machining the first zone of the result table by effecting the passage of the tool through each of the points coded in the preceding step so as to obtain a succession of linear movements of the tool which are oriented either parallel to the axes of the plane X-Y or at 45° with respect to said axes said machining step consisting, specifying at the outset that all the coded points are "non machined" points:

in determining a first coded point called "beginning of machining" point;

to pass successively from a current point to the next point, said current point being at the outset the "beginning of machining" point, in searching among its neighbors for the highest level "non machined" point and determining whether this level is less or greater than that of the current point; if it is less, considering the current point as a "machined" point over which the tool shall not pass again; if it is greater, in considering the current point as a "waiting" point over which the tool may pass again.

8. The method as claimed in claim 7, wherein the step of calculating the result table consists, using an algorithm which, knowing the preceding state—"machinable" or "non machinable" or "void"—which each of the points of the result table takes, determines the resultant state—"machinable", "non machinable" or "void"—which each of said points of the result table takes on as a function of each of the two profiles for the open pocket—surfacing for its overall outer profile, and wall profile and according to whether the corresponding point at the same indexed position in the intermediate table proper to each of the two profiles for the pocket is a limit, inner or outer point, in applying said algorithm successively for each of the two profiles for the pocket starting for the first profile form the result table in which all the points are at the "machinable" state and transferring each of the resultant states to the result table in the form of the first same character if the resultant state is a "machinable" state in the case where profile for the pocket is its outer overall profile—surfacing—or its wall profile, in the form of a second same character if the resultant state is a "non machinable" state in the case where the profile for the pocket is its wall profile, and in the form of the same third character if the resultant state is a "void" state in the case where the profile for the pocket is its overall outer profile—surfacing.

9. A method for automatically determining the tool path in plane machining of an open pocket to be machined in a workpiece and containing at least one islet and/or at least one recess, said open pocket being defined outwardly by at least one wall defining a region not to be machined and by at least one outer contour edge of the workpiece, and having in a plane X-Y an outer overall profile comprising that of the wall and that of the edge of the workpiece and being formed of a succession of straight line and/or arc of a circle segments, the islet and/or the recess each having in the plane X-Y a closed outer profile also formed of a succession of straight line and/or arc of a circle segments, comprising the following steps:

i. forming a cross-ruling extending in the plane X-Y over the whole open pocket with the same line and column pitch which depends on the diameter of the tool, the apices of the cross-ruling being referenced by line and column indices;

ii. (a) quantifying the outer overall profile of the open pocket, considering it as a surfacing profile, the islet profile and/or the recess profile, said quantifying step consisting:

for each of said profiles, and starting from a same cross-ruling, in determining by their respective line and column indices, limit points which are the apices of the cross-ruling the closest to the profile, obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to each of the profiles and having the same dimensions and the same line and column pitch as the cross-ruling, at the same indexed line and column positions as those of the cross-ruling, the respectively limit, inner and outer points of the profile, representing them by respective identification symbols;

(b) quantifying the wall profile of the open pocket, considering it as an islet profile of zero thickness, said quantifying step consisting:

starting from the same cross-ruling, in determining by their respective line and column indices, limit points which are the apices of the cross-ruling the closest to the wall profile of the open pocket, obtained by searching in each line and each column of the cross-ruling for the intersections with the profile and the points situated on each side of the profile which are outer points formed by the apices of the cross-ruling left unoccupied by the limit points;

in transferring to an intermediate table proper to the wall profile of the open pocket and having the same dimensions and the same line and column pitch as the cross-ruling, at the same indexed line and column positions as those of the cross-ruling, the respectively limit and outer points of the profile, representing them by respective identification symbols;

iii. calculating a result table which is the image of the open pocket—islet and/or recess assembly, having the same dimensions and the same line and column pitch as the intermediate table, comprising a first zone representative of the pocket except for its wall and formed of machinable points to each of which is assigned a same first given character and which correspond to the limit and inner points of the overall outer profile of the pocket, a second zone representative of the wall of the pocket bordering the first zone and formed of non machinable points to each of which is assigned a same second given character different from the first one and which correspond to the limit points of the wall profile of the pocket, a third zone outside the two preceding ones and formed of void points to each of which is assigned a same third given character different from the second one and which correspond to the outer points of the overall outer profile of the pocket and, inside the first zone, a fourth zone representative of the islet and formed of non machinable pints to each of which is assigned a same fourth given character different from the third one and which correspond to the limit and inner points of the islet profile and/or a fifth zone representative of the recess and formed of void points to each of which is assigned a same fifth given character different from the fourth one and which correspond to the limit and inner points of the recess profile;

iv. shifting each of the open pocket, islet and/or recess respective profiles, said shifting operation consisting, starting from said result table:

in determining, for the open pocket profile, for each non machinable point of the second zone of the result table, the machinable points of the first zone whose distance to said non machinable point is less than the radius of the tool, and in transforming said machinable points into non machinable points to which the same second character is assigned; and, for each machinable point of the first zone of the result table, the void points of the third zone whose distance to said machinable point is less than the radius of the tool, and in transforming said void points into machinable points to which the same first character is assigned;

for the islet profile, in determining, for each non machinable point of the fourth zone of the result table, the machinable points of the first zone whose distance to said non machinable point is less than the radius of the tool, and in transforming said machinable points into non machinable points to which the same fourth character is assigned;

for the recess profile, in determining, for each machinable point of the first zone of the result table, the void points of the fifth zone whose distance to said machinable point is less than the radius of the tool, and in transforming said void points into machinable points to which the same first character is assigned;

v. coding the machinable points of the first zone of the result table once the shift has been made, said coding step consisting in:

assigning to any first point of said zone, called starting point, a level represented by the integer 1;

assigning to a second point adjacent the starting point and situated on the same line or the same column as the latter, a level represented by the integer 2;

passing then from a coded current point to the next point by searching among its neighbors to see if a non coded point exists, said search taking place from the point which was coded prior to the current point and turning about the current point in the same predetermined search direction; if the non coded point exists, assigning thereto a level represented by the integer $n+1$ if the level assigned to the current point is represented by the positive integer n; if the non coded point does not exist, "back-tracking" until a coded point is found which has at least one non coded neighbor, which point becomes the current point, the end of coding occurring when the "back-tracking" has been carried out as far as the starting point and when the latter has no non coded neighbor;

vi. machining of the first zone of the result table by effecting the passage of the tool through each of the points coded in the preceding step so as to obtain a succession of linear movements of the tool which are oriented either parallel to the axes of the plane X-Y or at 45° with respect to these axes, said machining step consisting, specifying at the outset that all the coded points are "non machined" points:

in determining a first coded point called "beginning of machining" point;

to pass successively from a current point to the next point, said current point being at the outset the "beginning of machining" point, in searching among its neighbors for the highest level "non machined" point and determining whether said level is less or greater than that of the current point; if it is less, considering the current point as a "machined" point over which the tool shall not pass again; if it is greater, in considering the current point as a "waiting" point over which the tool may pass again.

10. The method as claimed in claim 9, wherein the step of calculating the result table consists, using an algorithm which, knowing the preceding state—"machinable" or "non machinable" or "void" which each of the points of the result table takes, determines the resultant state—"machinable", "non machinable"or "void'-'—which each of said points of the result table takes on according to whether the profile considered is a surfacing for the overall outer profile of the open pocket, a wall profile of the open pocket, an islet or a recess profile and whether the corresponding point at the same indexed position in the intermediate table proper to the profile is a limit, inner or outer point, in applying said algorithm successively for each of the profiles, starting for the first profile considered from the result table in which all the points are at the "machinable" state and transferring each of the resultant states to the result table in the form of the first same character if the resultant state is a "machinable" state whatever is the profile, in the form of the same second character if the resultant state is a "non machinable" state in the case where the profile is the wall profile of the pocket, in the form of the same third character if the resultant state is a "void" state in the case where the profile is the overall outer profile—surfacing—of the pocket, in the form of the same fourth character if the resultant state is a "non machinable" state in the case where the profile is the islet profile and in the form of the same fifth character if the resultant state is a "void" state in the case where the profile is the recess profile.

11. A method for automatically determining the tool path in plane machining of a surfacing of a workpiece, said surfacing being defined outwardly by the contour of the workpiece and having in a plane X-Y an outer profile formed by the edge of the workpiece and comprising a succession of straight line and/or arc of a circle segments, comprising the following steps:

i. forming a cross-ruling extending in the plane X-Y over the whole surfacing with the same line and column pitch which depends on the diameter of the tool, the apices of the cross-ruling being referenced by the line and column indices;

ii. quantifying the surfacing profile, said quantifying step consisting:

starting from the same cross-ruling, in determining by their respective line and column indices, limit points which are the apices of the cross-ruling the closest to the surfacing profile, obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to the surfacing profile and having the same dimensions and the same line and column pitch as the cross-ruling, at the same indexed line and column positions as those of the cross-ruling, respectively the limit, inner and outer points of the profile, representing them by respective identification symbols;

iii. calculating a result table which is the image of the surfacing having the same dimensions and the same line and column pitch as the intermediate table, comprising a first zone representative of the surfacing and formed of machinable points to each of which is assigned a same first given character and which correspond to the limit and inner points of the surfacing profile, and a second zone outside the first one and formed of void points to each of which is assigned a same second given character different from the first one and which correspond to the outer points of the surfacing profile;

iv. shifting the surfacing profile, said shifting step consisting, starting from the result table: in determining, for each machinable point of the first zone of the result table, the void points of the second zone whose distance to said machinable point is less than the radius of the tool, and in transforming these void points into machinable points to which the same first character is assigned;

v. coding the machinable points of the first zone of the result table once the shift has been made, said coding step consisting in:

assigning to any first point of said zone, called starting point, a level represented by the integer 1;

assigning to a second point adjacent the starting point and situated on the same line or the same column as the latter a level represented by the integer 2;

passing then from a coded current point to the next point by searching among its neighbors to see if a non coded point exists, said search taking place from the point which was coded previously to the current point and turning about the current point in the same predetermined search direction; if the non coded point exists, assigning thereto a level represented by the integer $n+1$ if the level assigned to the current point is represented by the positive integer n; if the non coded point does not exits, "back-tracking" until a coded point is found which has at least one non coded neighbor, which point becomes the current point, the end of coding occurring when the "backing-tracking" has been carried out as far as the starting point and when the latter has no non coded neighbor;

vi. machining the first zone of the result table by effecting the passage of the tool through each of the points coded in the preceding step so as to obtain a succession of linear movements of the tool which are oriented either parallel to the axes of the plane X-Y or at 45° with respect to said axes, said machining step consisting, specifying at the outset that all the coded points are "non machined" points:

in determining a first coded point called "beginning of machining" point;

to pass successively from a current point to the next point, said current point being at the start the "beginning of machining" point, in searching among its neighbors for the highest level "non machined" point and determining whether said level is less or greater than that of the current point; if it is less, considering the current point as a "machined" point over which the tool shall not pass again; if it is greater, in considering the current point as a "waiting" point over which the tool may pass again.

12. The method as claimed in claim 11, wherein the step of calculating the result table consists, starting from the result table in which all the points are in the "machinable" state, in applying an algorithm for determining the resultant state—"machinable", or "void"—which each of said points of the result table takes on depending on whether the corresponding point in the same indexed position in the intermediate table proper to the surfacing profile is a limit, inner or outer point, and transferring each of said resultant states to the result table in the form of the first same character if the resultant state is a "machinable" state and in the form of the same second character if the resultant state is a "void" state.

13. A method for automatically determining the tool path in plane machining of a surfacing of a workpiece, and containing at least one islet and/or at least one recess, said surfacing being defined outwardly by the contour of the workpiece and having in a plane X-Y an outer profile formed by the edge of the workpiece and comprising a succession of straight line and/or arc of a circle segments, the islet and/or the recess each having in the plane X-Y a closed outer profile also formed of a succession of straight line and/or arc of a circle segments, comprising the following steps:

i. forming a cross-ruling extending in the plane X-Y over the whole surfacing with the same line and column pitch which depends on the diameter of the tool, the apices of the cross-ruling being referenced by line and column indices;

ii. quantifying the surfacing profile, islet and recess profiles the quantifying step consisting:

for each of the profiles and starting from the same cross-ruling, in determining by their respective line and column indices, limit points which are the apices of the cross-ruling the closest to the profile, obtained by searching in each line and each column of the cross-ruling for the intersections with the profile and the inner and outer points situated respectively inside and outside the profile which are the apices of the cross-ruling left unoccupied by the limit points;

in transferring to an intermediate table proper to each of the profiles and having the same dimensions and the same line and column pitch as the cross-ruling, at the same indexed line and column positions as those of the cross-ruling, the respective limit, inner and outer points of the profile, representing them by respective identification symbols;

iii. calculating a result table which is the image of the surfacing—islet and/or recess assembly—, having the same dimensions and the same line and column pitch as the intermediate table, comprising a first zone representative of the surfacing and formed of machinable points to each of which is assigned a same first given character and which correspond to the limit and inner points of the surfacing profile, a second zone outside the first one and formed of void points to each of which is assigned a same second given character different from the first one and which correspond to the outer points of the surfacing profile and, inside the first zone, a third zone representative of the islet and formed of non machinable points to each of which is assigned a same third given character different from the second one and which correspond to the limit and inner points of the islet profile and/or of a fourth zone representative of the recess and formed of void points to each of which is assigned a same fourth given character different from the third one and which correspond to the limit and inner points of the recess profile;

iv. shifting each of the profiles, said shifting step consisting, starting from the result table:

for the surfacing profile, in determining, for each machinable point of the first zone of the result table, the void points of the second zone whose distance to said machinable point is less than the radius of the tool, and in transforming said void points into machinable points to which the same first character is assigned;

for the islet profile, in determining, for each non machinable point of the third zone of the result table, the machinable points of the first zone whose distance to said non machinable point is less than the radius of the tool, and in transforming said machinable points into non machinable points to which the same third character is assigned;

for the recess profile, in determining, for each machinable point of the first zone of the result table, the void points of the fourth zone whose distance to said machinable point is less than the radius of the tool, and in transforming said void points into machinable points to which the same first character is assigned;

v. coding the machinable points of the first zone of the result table once the shift has been made, said coding step consisting in:

assigning to any first point of said zone, called starting point a level represented by the integer 1;

assigning to a second point adjacent the starting point and situated on the same line or the same column as the latter a level represented by the integer 2;

passing then from a coded current point to the next point by searching among its neighbors to see if a non coded point exists, said search taking place from the point which was coded previously to the current point and turning about the current point in the same predetermined search direction; if the non coded point exists, assigning thereto a level represented by the integer n+1 if the level assigned to the current point is represented by the positive integer n; if the non coded point does not exist, "back-tracking" until a coded point is found which has at least one non coded neighbor, which point becomes the current point, the end of coding occurring when the "back-tracking" has been carried out as far as the starting point and when the latter has no non coded neighbor;

vi. machining the first zone of the result table by effecting the passage of the tool through each of the points coded in the preceding step so as to obtain a succession of linear movements of the tool which are oriented either parallel to the axes of the plane X-Y or at 45° with respect to these axes of the machining step consisting, specifying at the outset that all the coded points are "non machined" points:

in determining a first coded point called "beginning of machining" point;

to pass successively from a current point to the next point, said current point being at the start the "beginning of machining" point, in searching among its neighbors for the highest level "non machined" point and determining whether said level is less or greater than that of the current point; if it is less, considering the current point as a "machined" point over which the tool shall not pass again; if it is greater, in considering the current point as a "waiting" point over which the tool may pass again.

14. The method as claimed in claim 13, wherein the step of calculating the result table consists, using an algorithm which, knowing the preceding state—"machinable" or "non machinable" or "void"—which each of the points of the result table takes, determines the resultant state—"machinable", "non machinable" or "void"—which each of said points of the result table takes on according to whether the profile is a surfacing, islet or recess profile and whether the corresponding point at the same indexed position in the intermediate table proper to the profile is a limiting, inner or outer point, in applying said algorithm successively for each of the profiles starting for the first profile from the result table in which all the points are at the "machinable" state and transferring each of the resultant states to the result table in the form of the same first character if the resultant state is a "machinable" state whatever is the profile in the form of the same second character if the resultant state is a "void" state in the case where the profile is a surfacing profile, in the form of the same third character if the resultant state is a "non machinable" state in the case where the profile is an islet profile and in the form of the same fourth character if the resultant state is a "void" state in the case where the profile is a recess profile.

15. The method as claimed in claim 1, wherein, starting from the cross-ruling in which the pitch is chosen equal to half the machining pass setting, which pass setting depends on the diameter of the tool, the method comprises processing of the result table after shifting, said processing taking only into account one line out of two and one column out of two so as to have a result table whose pitch is equal to the machining pass setting.

16. The method as claimed in claim 15, wherein the maximum machine pass setting is less than $D/\sqrt{2}$, D being the diameter of the tool.

* * * * *

UNITED STATES PATENT AND TRADEMARK OFFICE
CERTIFICATE OF CORRECTION

PATENT NO. : 5,159,559
DATED : October 27, 1992
INVENTOR(S) : Alain Canourgues

It is certified that error appears in the above-indentified patent and that said Letters Patent is hereby corrected as shown below:

On the title page, item [19], "Alain" should be --Canourgues-- and item [75], "Canourgues Alain" should be --Alain Canourgues--.

Signed and Sealed this

Twelfth Day of October, 1993

Attest:

BRUCE LEHMAN

*Attesting Officer*  *Commissioner of Patents and Trademarks*